(12) United States Patent
Lochun et al.

(10) Patent No.: US 11,809,669 B2
(45) Date of Patent: Nov. 7, 2023

(54) TOUCH SENSOR DEVICES HAVING INTEGRATED RESISTORS

(71) Applicant: Sensel, Inc., Sunnyvale, CA (US)

(72) Inventors: Darren Lochun, Mountain View, CA (US); Ilya Daniel Rosenberg, Mountain View, CA (US)

(73) Assignee: SENSEL, INC., Sunnyvale, CA (US)

( * ) Notice: Subject to any disclaimer, the term of this patent is extended or adjusted under 35 U.S.C. 154(b) by 0 days.

(21) Appl. No.: 17/465,620

(22) Filed: Sep. 2, 2021

(65) Prior Publication Data

US 2023/0067700 A1    Mar. 2, 2023

(51) Int. Cl.
| | |
|---|---|
| *G06F 3/044* | (2006.01) |
| *G06F 3/041* | (2006.01) |
| *G06F 3/045* | (2006.01) |
| *H01B 1/12* | (2006.01) |

(52) U.S. Cl.
CPC ............ *G06F 3/0446* (2019.05); *G06F 3/0412* (2013.01); *G06F 3/045* (2013.01); *H01B 1/128* (2013.01); *G06F 2203/04112* (2013.01)

(58) Field of Classification Search
CPC ........ G06F 3/0412; G06F 3/045; H01B 1/128; G06F 2203/04112
See application file for complete search history.

(56) References Cited

U.S. PATENT DOCUMENTS

| | | | | |
|---|---|---|---|---|
| 2010/0045632 A1* | 2/2010 | Yilmaz et al. | ....... | G06F 3/0412 345/174 |
| 2014/0125403 A1* | 5/2014 | Yilmaz | ................ | G06F 3/0443 327/517 |
| 2015/0091858 A1* | 4/2015 | Rosenberg et al. | . | G06F 3/04144 345/174 |
| 2020/0150793 A1* | 5/2020 | Hsu | .................... | G06F 3/0445 |

* cited by examiner

*Primary Examiner* — Robin J Mishler
(74) *Attorney, Agent, or Firm* — Amin, Turocy & Watson, LLP

(57) ABSTRACT

Touch sensor technologies are provided. In some embodiments, a touch sensor device includes an array of conductive members. The touch sensor device also includes a first routing trace electrically coupled to a first conductive member of the array of conductive members. The touch sensor device also includes a second routing trace electrically coupled to a second conductive member of the array of conductive member. The first and second routing traces extend to a connector integrated into the touch sensor device. The touch sensor device further includes a resistor that electrically couples the first routing trace and the second routing trace. A third conductive member of the array of conductive members is placed between the first and second conductive members. By incorporating a resistor, density of conductive members (sense lines and/or drive lines) can be increased without increasing density of routing traces to the connector.

26 Claims, 19 Drawing Sheets

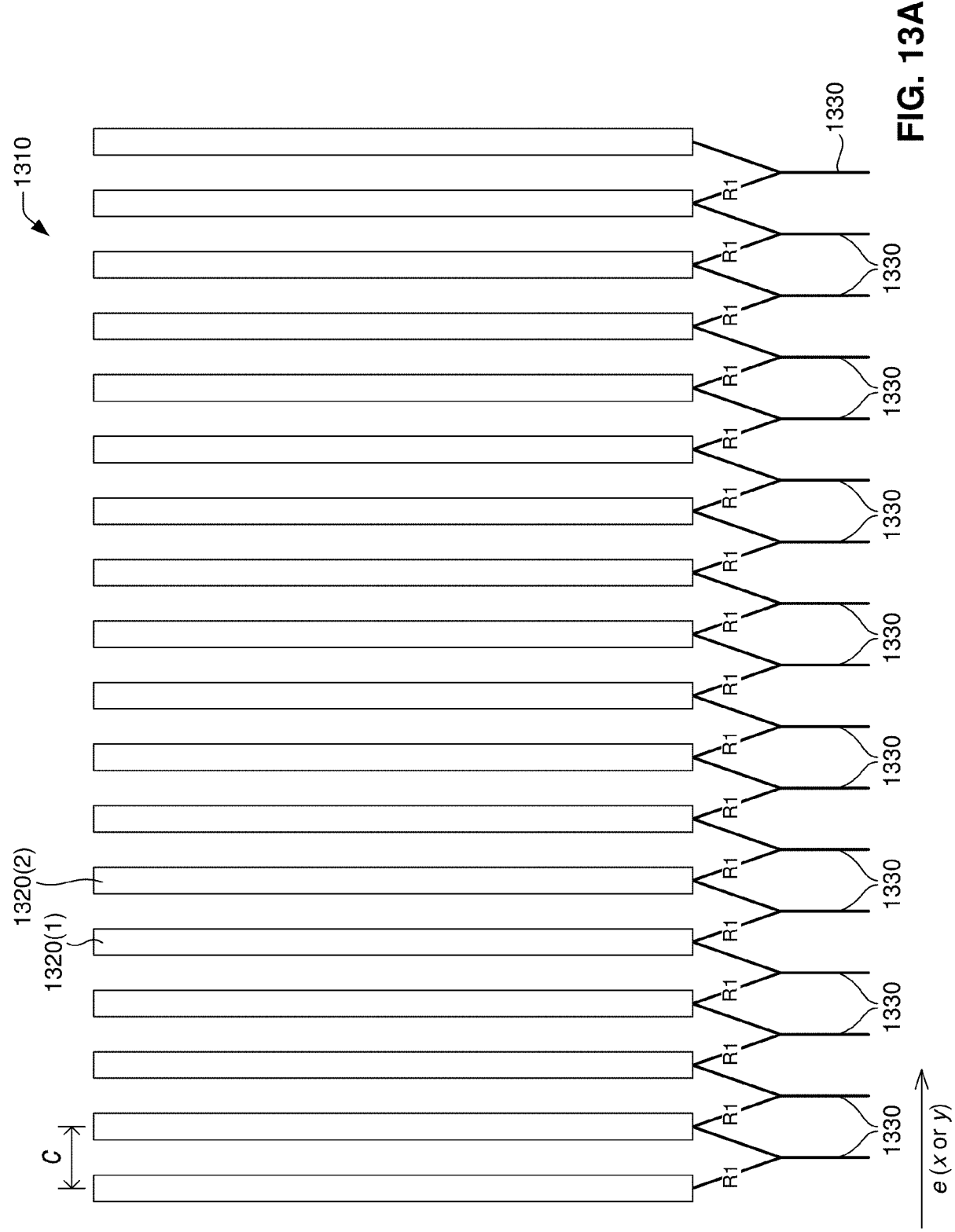

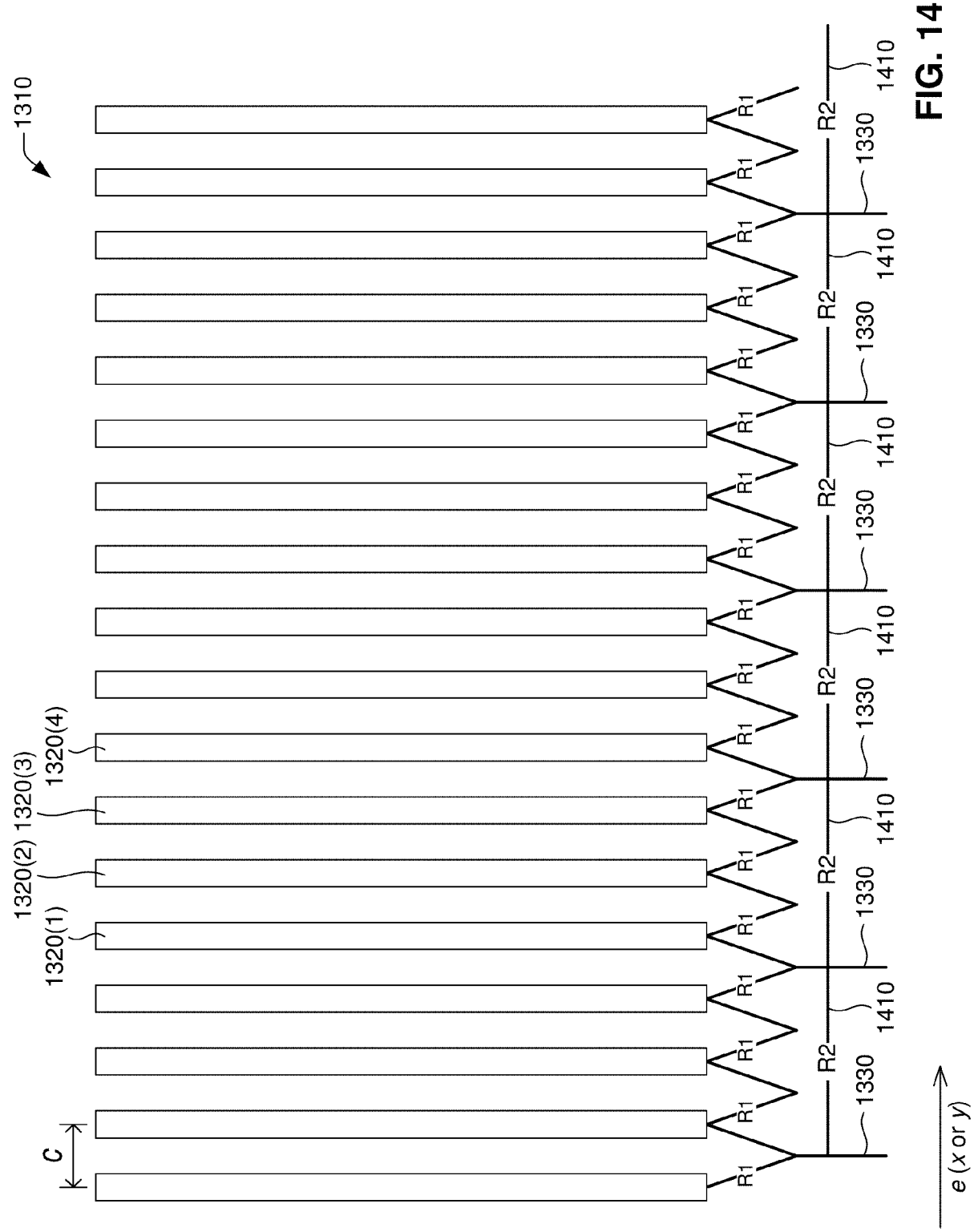

TOUCH SENSOR DEVICES HAVING INTEGRATED RESISTORS

BACKGROUND

A touch sensor device can rely on sensing arrays of conductive members to touch points where physical contact is made with a touch layer that overlays the sensing arrays. In commonplace configurations, one of the sensing arrays has first transparent conductive members oriented along a first direction, and the other one of the sensing arrays has second transparent conductive members oriented along a second direction that is substantially orthogonal to the first direction. The sensing arrays can be assembled at a defined distance from one another. Thus, overlapping sections of the first conductive members and second conductive members can form a grid of capacitive structures that can be used to sense regions where contact has been made with the touch layer. Those regions can be referred to as sense points. A sense point is not necessarily discrete but rather there is a gradient of sensitivity that diminishes to some degree from the intersection of drive and sense overlap.

Both of the sensing arrays can have a defined pitch that defines, at least partially, a density of conductive members within a sensing array. In order to route signals representative of sense points, routing traces can be electrically coupled to respective conductive members and can be routed to a connector integrated into the touch sensor device. Accordingly, the density of routing traces increases with the density of conductive members within the sensing array. Consequently, greater sensitivity of the touch sensor device can be achieved by decreasing the defined pitch.

Decreasing the defined pitch of the sensing arrays of conductive members causes an increase in the number of routing traces. Such an increase is proportional to the amount of reduction of the defined pitch. For instance, a reduction of the defined pitch by a factor of four, e.g., the defined pitch is reduced from 4 mm to 1 mm, can result in four times the number of routing traces needed to route the signals from the touch sensor device to a processing component. Even with techniques for efficient formation of routing traces, such an increase in the number of routing traces can require greater surface coupled to a connector of the touch sensor device.

Therefore, much remains to be improved in approaches to assemble routing traces in a touch sensor device. Accordingly, improved technologies for routing connecting traces in a touch sensor device may be desired.

SUMMARY

The following presents a simplified summary of some embodiments of this disclosure in order to provide a basic understanding of one or more of the embodiments. This summary is not an extensive overview of the embodiments described herein. It is intended to neither identify key or critical elements of the embodiments nor delineate any scope of embodiments or the claims. The sole purpose of this Summary is to present some concepts of the embodiments in a simplified form as a prelude to the more detailed description that is presented later.

In an embodiment, the disclosure provides a touch sensor device. The touch sensor device includes an array of conductive members. The touch sensor device also includes a first routing trace electrically coupled to a first conductive member of the array of conductive members. The first routing trace extends to a connector integrated into the touch sensor device. The touch sensor device further includes a second routing trace electrically coupled to a second conductive member of the array of conductive members. A third conductive member of the array of conductive members is placed between the first conductive member and the second conductive member. The second routing trace also extends to the connector. The touch sensor device also includes a first resistor that electrically couples the first routing trace and the second routing trace.

In another embodiment, the disclosure provides a touch sensor device. The touch sensor device includes an array of conductive members. The touch sensor device also includes a first routing trace electrically coupled to a first conductive member of the array of conductive members. The first routing trace extends to a connector integrated into the touch sensor device. The touch sensor device further includes a second routing trace electrically coupled to a second conductive member of the array of first conductive members. The second routing trace also extends to the connector. The touch sensor device also includes a first connecting trace electrically coupled to a third conductive member of the array of conductive members. A fourth conductive member of the array of conductive members is placed between the first conductive member and the third conductive member. In addition, a fifth conductive member of the array of conductive members is placed between the first conductive member and the second conductive member. The touch sensor device further includes a first resistor that electrically couples the first routing trace and the first connecting trace, and a second resistor that electrically couples the first routing trace and the second routing trace.

In yet another embodiment, the disclosure provides a display device that includes a touch sensor device. The touch sensor device includes an array of conductive members. The touch sensor device also includes a first routing trace electrically coupled to a first conductive member of the array of conductive members. The first routing trace extends to a connector integrated into the touch sensor device. The touch sensor device further includes a second routing trace electrically coupled to a second conductive member of the array of conductive members. A third conductive member of the array of conductive members is placed between the first conductive member and the second conductive member. The second routing trace also extends to the connector. The touch sensor device also includes a first resistor that electrically couples the first routing trace and the second routing trace.

Other embodiments and various examples, scenarios and implementations are described in more detail below. The following description and the drawings set forth certain illustrative embodiments of the specification. These embodiments are indicative, however, of but a few of the various ways in which the principles of the specification may be employed. Other advantages and novel elements of the embodiments described will become apparent from the following detailed description of the specification when considered in conjunction with the drawings.

BRIEF DESCRIPTION OF THE DRAWINGS

The accompanying drawings are an integral part of the disclosure and are incorporated into this specification. The drawings illustrate example of embodiments of the disclosure and, in conjunction with the description and claims, serve to explain various principles and aspects of the disclosure. Some embodiments of this disclosure are described more fully below with reference to the accompanying drawings. However, various aspects of the disclosure can be implemented in many different forms and should not be construed as limited to the implementations set forth herein. Like numbers refer to like elements throughout.

FIG. 13A illustrates another example of an array of conductive members coupled by integrated resistors, the conductive members can embody sense lines or drive lines of a touch senor device, in accordance with one or more embodiments of this disclosure.

FIG. 14 illustrates yet another example of an array of conductive member coupled by integrated resistors arranged in a nested spatial relationship, the conductive members can embody sense lines or drive lines of a touch senor device, in accordance with one or more embodiments of this disclosure.

DETAILED DESCRIPTION

Figure 1:
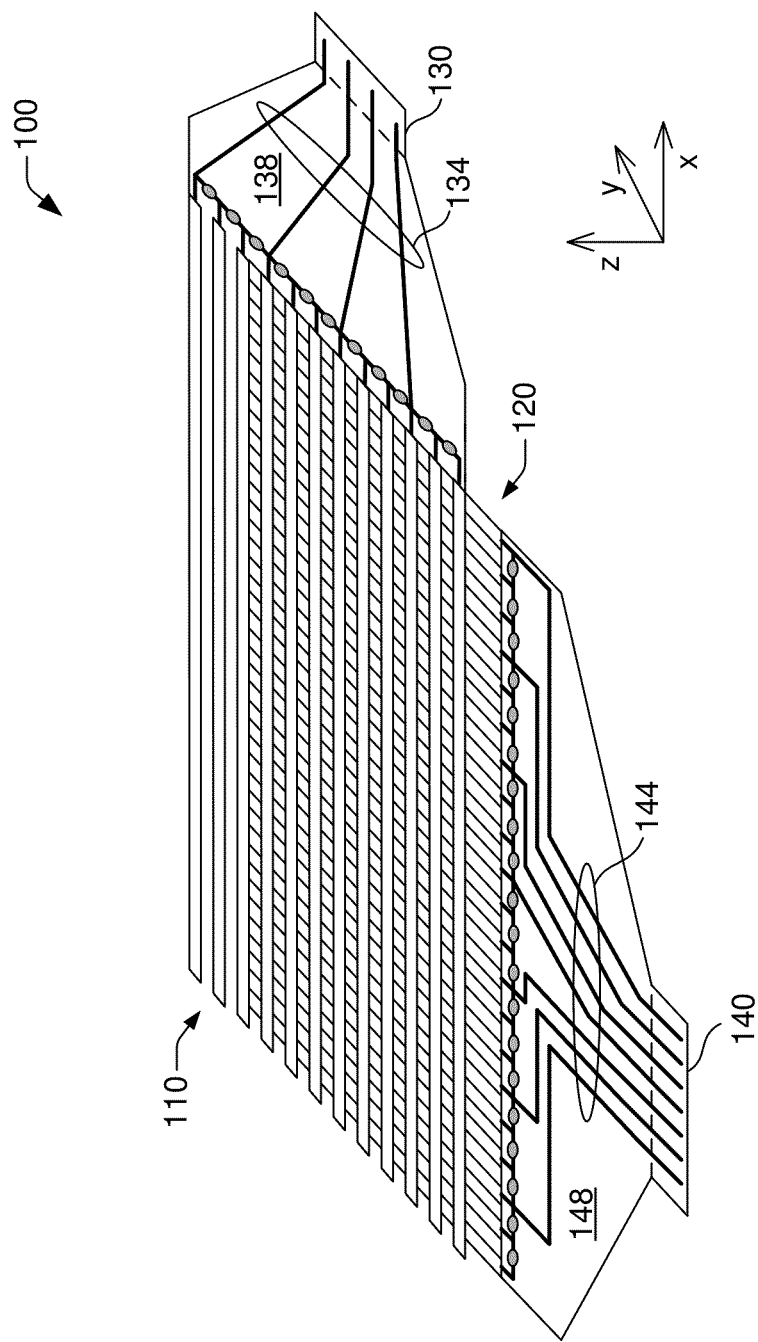
FIG. 1 is a schematic diagram of an arrangement of sense lines and drive lines in a touch sensor device, in accordance with one or more embodiments of this disclosure.

This disclosure recognizes and addresses, in at least some embodiments, the issue of configuring routing traces to a connector coupled to a touch sensor device. Embodiments of this disclosure include touch sensor devices that incorporate resistors in a periphery of a sensing area and/or within the sensing area. Locus of those internal resistors can be dictated by area available in connector(s) of a touch sensor device.

More specifically, in some embodiments, a touch sensor device can include a first resistor that electrically couples a first group of multiple conductive members of a sensing array of conductive members (e.g., an array of sense lines or an array of sense lines). The multiple conductive members (sense lines or drive lines) in the first group are adjacent to one another. The multiple conductive members can be formed from a material having defined optical properties. The optical properties can include, for example, transmissivity, haze, ultraviolet (UV) stability, a combination thereof, or similar. Such a material can be transparent, translucent, or opaque. The first resistor can couple those conductive members at, or near, respective contiguous ends of the multiple conductive members. The first resistor also electrically couples the first group of multiple conductive members to a routing trace that extends to a connector integrated into the touch sensor device. The touch sensor device also can include a second resistor that electrically couples a second group of multiple conductive members of the sensing array of conductive members. The multiple conductive members in the second group also are contiguous to one another. The second resistor can couple those conductive members at, or near, respective contiguous ends of the multiple conductive members. The second resistor also electrically couples the second group of multiple second conductive members to a second routing trace that extends to the connector. Multiple third resistors also can be integrated into the touch sensor device in order to couple respective groups of multiple conductive members in the sensing arrays. Each one of those other groups also can be electrically coupled, by respective ones of the third resistors, to a routing trace.

Embodiments of this disclosure can further reduce the number of routing traces in larger touch sensor devices by nesting the resistors that are incorporated into a touch sensor device. Tiers of nested resistors can used to differentiate between different conductive members (e.g., sense lines or drive lines) while maintaining a satisfactory number of routing traces to a connector of the touch sensor.

A resistor can be incorporated into a touch sensor device by forming the resistor using one or a combination of material deposition processes. For purposes of illustration, a material deposition process can include physical vapor deposition (PVD), chemical vapor deposition (CVD), or spin coating. In some cases, the resistor can be formed using an additive process to deposit an amount of a resistive material in a particular geometry onto a substrate. The resistive material has a desired or otherwise suitable resistivity such that the resulting geometry of the formed resistor yields a resistance in a range from about 100 Ω to about 10000 Ω. In one example, the resistive material can be embodied in printed carbon ink. The substrate onto which the carbon ink is printed can be embodied in polyethylene terephthalate (PET). In another example, the resistive material can be embodied in a metal-ceramic composite. Other substrates besides a PET substrate can be used to deposit the metal-ceramic composite. Those other substrates can be suitable for touch sensor devices in select applications. The substrate can be treated (e.g., the substrate can include other structures thereon) or can be untreated, and can form a connecting pad coupled to a connector of a touch sensor device. In other cases, the resistor can be formed using a subtractive process to remove an amount of material from a uniform layer of a resistive material that has been formed via a deposition process or from a laminate construction.

By incorporating resistors that electrically couple respective groups of multiple conductive members into a touch sensor device, fewer routing traces can be assembled to route signal from a sensing array to a connector compared to commonplace configurations that configure a routing trace per conductive member. Because the number of conductive members in the sensing array can be readily increased by utilizing appropriate processes for depositing materials on a substrate, the density of conductive members can be increased while preserving the number of routing traces. As a result, sensitivity of the sensing array can be increased without causing changes to the number of routing traces to a connector of a touch sensor device. Increased sensitivity of the sensing array (e.g., obtained by increasing the density of drive lines and/or sense lines) can permit greater brush and/or stylus sensitivity, and greater finger-touch or finger-swipe input on a display device that incorporates the sensing array.

Besides improving sensitivity, increasing the number of conductive members in the sensing array also results in smaller non-overlapping regions in a touch sensor device. A non-overlapping region corresponds to a section of sensing area where a conductive member in the sensing array (e.g., sense array) does not overlap with another conductive member in a second sensing array (e.g., drive array). Thus, embodiments of this disclosure can provide smaller inactive regions and can avoid the removal of those inactive regions after formation of the sensing array.

The resistors that electrically couple respective groups of multiple conductive members into a touch sensor device can serve as interpolation resistors. As such, the resistors can provide improved trace resolution with respect to traditional capacitance touch sensors. Further, touch sensor devices that incorporate resistors in accordance with aspects of this disclosure can be integrated into display devices. To that end, in some embodiments, sensing arrays in a display device can have a commonplace pitch (e.g., 4 mm) and resistors can be integrated into the periphery of the sensing arrays. In addition, active display elements can be placed in regions between conductive members of conductive members of the sensing arrays.

Although embodiments of this disclosure are illustrated in connection with planar sensor devices, the disclosure is not limited in that respect. Indeed, the principles of this disclosure can be applied to curved touch sensor devices. In some cases, the curved touch sensor device can be rigid and formed to have a defined curvature. In other cases, the curved touch sensor device can be formed from flexible materials, and can be overlaid on a curved solid surface. Surface of a flat sensor or curved sensor can be oriented at any angle relative to a vantage point of an end-user, thus facilitating a desired user interface/experience.

With reference to the drawings, FIG. 1 is a schematic diagram 100 of an arrangement of sense lines 110 and drive lines 120 within in a touch sensor, in accordance with one or more embodiments of this disclosure. The sense lines 110 are substantially contained in a first plane and can be substantially parallel to one another along a first direction (denoted as x in FIG. 1 for the sake of nomenclature). The sense lines 110 form a planar structure that is periodic along a second direction orthogonal to the first direction and has a defined pitch a (a real number in units of length) along the second direction. The defined pitch a has a magnitude in a range from about 50 µm to about 5 mm. In one example, a is equal to 1 mm. In some embodiments, each one of the sense lines 110 is formed from a material that is conductive and has defined optical properties. The material can be transparent, translucent, or opaque. Such a material can be a transparent conductive oxide (TCO), a transparent conductive polymer, or a non-transparent conductive polymer, for example. Numerous conductive polymers can be used to form a conductive member that embodies a sense line. Examples of such conductive polymers include the following: poly(fluorene)s, polyphenylenes, polypyrenes; polyazulenes; polynaphthalenes; poly(pyrrole)s (PPY); polycarbazoles; polyindoles; polyazepines; polyanilines (PANI); poly(thiophene)s (PT); poly(3,4-ethylenedioxythiophene) (PEDOT); poly(p-phenylene sulfide) (PPS); oly(acetylene)s (PAC); poly(p-phenylene vinylene) (PPV).

In other embodiments, each one of the sense lines 110 can be embodied in a metal nanowire or a carbon nanotube (or bud). The metal nanowire can be embodied in a silver nanowire, a gold nanowire, or a platinum nanowire, or a metal nanowire formed from another noble metal. The metal nanowire also can be formed from a non-noble metal, such as a transition metal or a simple metal, in some cases. In still other embodiments, the sense lines 110 can embody a periodic structure along a particular direction, where the structure is formed by patterning a conductive material (such as a metal thin film) or sputtering thin elongated segments of a metal or a combination of metals (e.g., a metal alloy or a co-deposited heterostructure) on a solid surface of a substrate.

The substrate can be embodied in a printed circuit board in some cases. Here, patterning can include an additive process or a subtractive process depending on the type of conductive material used to form the sense lines 110.

The drive lines 120 are substantially contained in a second plane and can be substantially parallel to one another along a second direction (denoted as y in FIG. 1, for the sake of nomenclature). The second plane and first plane are parallel to one another and are separated by a defined distance (e.g., 10 µm, 50 µm, 100 µm, 500 µm, 1 mm, 2 mm, or 5 mm, for example). The second direction is orthogonal to the first direction. The drive lines 120 also form a planar structure having a defined pitch b (a real number in units of length) along a direction that is orthogonal to the second direction. In some cases, the defined pitch b is equal to the pitch a. The defined pitch b has a magnitude in a range from about 50 µm to about 5 mm. In one example, the defined pitch b is equal to 1 mm. In some embodiments, each one of the drive lines 120 is formed from a material that is conductive and has defined optical properties. The material can be transparent, translucent, or opaque. Such a material can be a TCO, a transparent conductive polymer, or a non-transparent conductive polymer, for example. Numerous conductive polymers can be used to form a conductive member that embodies a drive line. Example of such conductive polymers include the following: poly(fluorene)s, polyphenylenes, polypyrenes; polyazulenes; polynaphthalenes; poly(pyrrole)s (PPY); polycarbazoles; polyindoles; polyazepines; polyanilines (PANI); poly(thiophene)s (PT); poly(3,4-ethylenedioxythiophene) (PEDOT); poly(p-phenylene sulfide) (PPS); oly(acetylene)s (PAC); poly(p-phenylene vinylene) (PPV). In some embodiments, the material that forms the drive lines 120 can be the same as the material that forms the sense lines 110. In other embodiments, the material that forms the drive lines 120 can be different from the material that forms the sense lines 110.

In other embodiments, each one of the drive lines 110 can be embodied in a metal nanowire or a carbon nanotube (or bud). The metal nanowire can be embodied in a silver nanowire, a gold nanowire, or a platinum nanowire, or a metal nanowire formed from another noble metal. The metal nanowire also can be formed from a non-noble metal, such as a transition metal or a simple metal, in some cases. In still other embodiments, the drive lines 110 can embody a periodic structure along a particular direction, where the structure is formed by patterning a conductive material (such as a metal thin film) or sputtering thin elongated segments of a metal or a combination of metals (e.g., a metal alloy or a co-deposited heterostructure) on a solid surface of a substrate. The substrate can be embodied in a PCB board in some cases. Again, patterning can include an additive process or a subtractive process depending on the type of conductive material used to form the drive lines 120.

It is noted that the array of sense lines 110 and the array of drive lines 120 need not be assembled in a substantially planar structure. In some embodiments, each one of those arrays can be assembled on a curved surface. In those embodiments, a distance separating adjacent conductive members (e.g., sense lines or drive lines) along a geodesic on the curved surface has a magnitude in a range from about 50 µm to about 5 mm. The geodesic can be orthogonal to a second geodesic on the curved surface.

The sense lines 110 can be assembled on a substrate (not depicted in FIG. 1) that has defined optical properties and is electrically insulating, and also has a uniform thickness. As mentioned, the optical properties can include, for example, transmissivity, haze, UV stability, a combination thereof, or similar. In one aspect, the substrate can be transparent, translucent, or opaque depending on particular application of a touch sensor device that includes the substrate. The substrate has a defined dielectric strength. The magnitude of the uniform thickness can be in a range from about 10 µm to 5 mm. In some cases, the uniform thickness has a magnitude in a range from about 50 µm to 2 mm. The uniform thickness of the substrate permits assembly of other components of a display device and also permit capacitive sensing.

In some embodiments, the sense lines 110 can be assembled on a first surface of the substrate by treating the substrate according to a subtractive process or an additive process, or a combination of both. Such a treatment can result in sense lines 110 of essentially uniform thickness, where each one of the sense lines 110 can have a thickness in a range from about a few hundred nanometers (e.g., 300 nm, 400 nm, 500 nm, or 600 nm) to about 35 µm, in some cases. In other embodiments, the sense lines 110 can be assembled on the first surface of the substrate by using an adhesive to attach the sense lines 110 onto the first surface. The adhesive can be one of several types of adhesives that have defined optical properties and defined dielectric properties (such as dielectric constant, dielectric strength, or similar). As mentioned, the optical properties can include, for example, transmissivity, haze, UV stability, a combination thereof, or similar property. In some embodiments, the adhesive can be assembled in a multilayer structure that can provide a particular dielectric constant. The multilayer structure can include a first adhesive layer, a second adhesive layer, and a dielectric layer of a high-K material placed between the first adhesive layer and second adhesive layer. The first adhesive layer and the second adhesive layer can be contained in respective planes essentially parallel to the first surface of the substrate. In other embodiments, the adhesive can be assembled in a single layer including a filler dielectric material in order to achieve the particular dielectric constant. The filter dielectric material can be spatially distributed within the layer.

In some embodiments, the substrate can be embodied in, or formed from, a slab of a transparent and electrically insulating material. The substrate can be rigid or flexible. Accordingly, such a material can be a glass or plastic (e.g., polyester or polycarbonate). In embodiments in which the sense lines 110 are formed on the substrate by treating the substrate, the slab can have a precursor uniform thickness such that an additive treatment or subtractive treatment that yields the sense lines 110 results in a uniform thickness of the substrate in a range from about 10 µm to 5 mm.

In some configurations, the drive lines 120 also can be assembled on the substrate onto which the sense lines 110 are assembled. In some embodiments, the drive lines 120 can be assembled on a second surface the substrate by treating the substrate according to the subtractive process or the additive process, or a combination of both, used to form the sense lines 110. Such a treatment can result in drive lines 120 of essentially uniform thickness, where each one of the sense lines 110 can have a thickness in a range from about a few hundred nanometers (e.g., 300 nm, 400 nm, 500 nm, or 600 nm) to about 35 µm, in some cases. In other embodiments, the drive lines 120 can be assembled on a second surface of the substrate by using an adhesive to attach the drive lines 120 onto the second surface. Regardless of the process to assembled the drive lines 120, the second surface of the substrate is opposite the first surface of the substrate, and the second surface is substantially parallel to the first surface.

In other cases, the drive lines 120 can be assembled on a second substrate (not depicted in FIG. 1). In some embodiments, the drive lines 120 can be assembled on a first surface of the second substrate by treating the second substrate according to a subtractive process or an additive process, or a combination of both. In other embodiments, the drive lines 120 can be assembled on the first surface of the second substrate by using an adhesive to attach the drive lines 110 onto the first surface of the second substrate. The second substrate also can be transparent and electrically insulating and has a uniform thickness. The second substrate can be oriented parallel to the substrate onto which the sense lines 110 are assembled. The magnitude of the uniform thickness of the second substrate can be in a range from about 10 μm to 5 mm. In some cases, the uniform thickness has a magnitude in a range from about 50 μm to 2 mm. The uniform thickness of the substrate permits assembly of other components of a display device and also permit capacitive sensing.

In some embodiments, the second substrate can be embodied in, or can be formed from, a slab of a transparent and electrically insulating material. The second substrate can be rigid or flexible. Accordingly, such a material can be a glass or a plastic (e.g., polyester or polycarbonate). In embodiments in which the drive lines 120 are formed on the second substrate by treating the second substrate, the slab can have a precursor uniform thickness such that the additive treatment or subtractive treatment that yields the drive lines 120 results in a uniform thickness of the substrate in a range from about 10 μm to 5 mm.

A transparent adhesive layer can attach the substrate having the sense lines 110 assembled thereon and the second substrate having the drive lines 120 assemble thereon. Thus, a monolithic transparent sensor slab that contains the sense lines 110 and the drive lines 120 can be formed.

The touch sensor device that includes the sense lines 110 and the drive lines 120 also includes, in some embodiments, a touch layer that overlays the monolithic sensor slab. The touch layer can be exposed to an environment of the touch sensor that include the sensing assembly 200, and can permit interaction between an end-user and the touch sensor. In some cases, the touch layer can be monolithically integrated into the substrate having the sense lines 110. Specifically, the touch layer can be formed on a second surface of the substrate, where the second surface is opposite the surface forming an interface with the sense lines 110. In other cases, the touch layer can be affixed to the second surface. Regardless of the mechanism to incorporate the touch layer into the touch sensor, the touch layer can be embodied in, or can constitute, for example, an antimicrobial coating, an anti-glare coating, anti-fingerprint coating (e.g., an oleophobic coating), a hydrophobic coating, a scratch-resistant coating, a polarizing coating, a translucent coating, a color-filtered coating, a partially opaque coating, a fully opaque coating, a combination thereof, or similar.

Figure 2A:
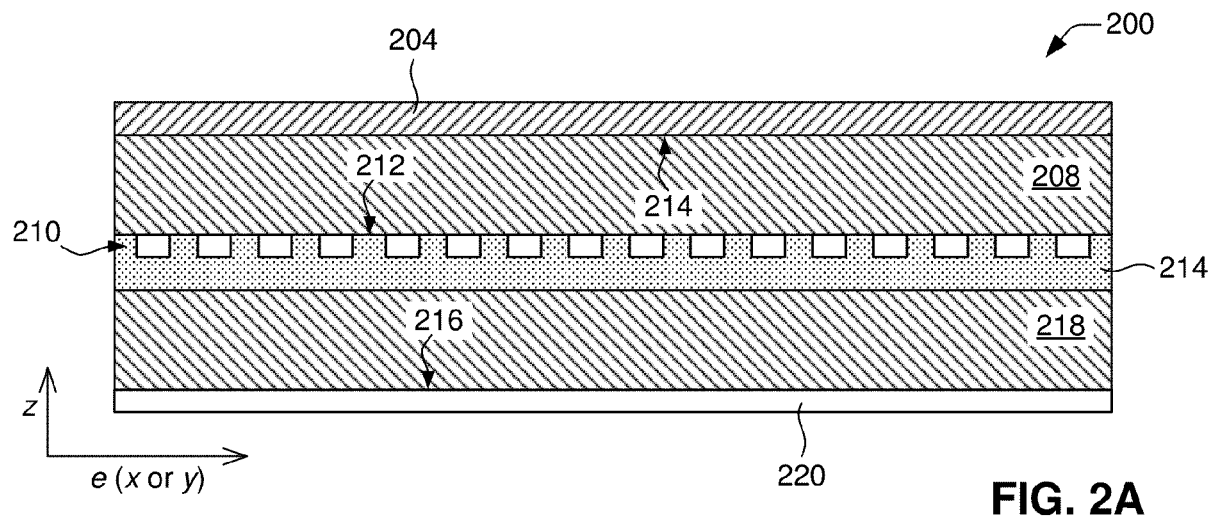
FIG. 2A is a schematic cross-section of an example of a sensing assembly including sense lines and drive lines, in accordance with one or more embodiments of this disclosure.

For purposes of illustration, FIG. 2A, FIG. 2B, FIG. 2C, FIG. 2D, and FIG. 2E illustrate examples of monolithic sensor assemblies, in accordance with one or more embodiments of this disclosure. The configuration of each one of the sensing assemblies illustrated in FIGS. 2A to 2C can be referred to as a single-sided dual-substrate configuration. Specifically, FIG. 2A is a schematic cross-section of an example of a sensing assembly 200 including sense lines 210 and drive lines 220. The sense lines 210 are oriented along a direction that is orthogonal to an e direction (either x direction or y direction) orthogonal to the z direction. The drive lines 220 are parallel to the e direction. The sense lines 210 are assembled on a first surface 212 of a first substrate 208, and the drive lines 220 are assembled on a first surface 216 of a second substrate 218. The sensing assembly 200 also includes a transparent adhesive layer 214 that attaches the first substrate 218 and the second substrate 218. The sensing assembly 200 further includes a touch layer 204 that forms an interface 215 with the first substrate 208. As mentioned, in some embodiments, the touch layer 204 may be absent.

Figure 2B:
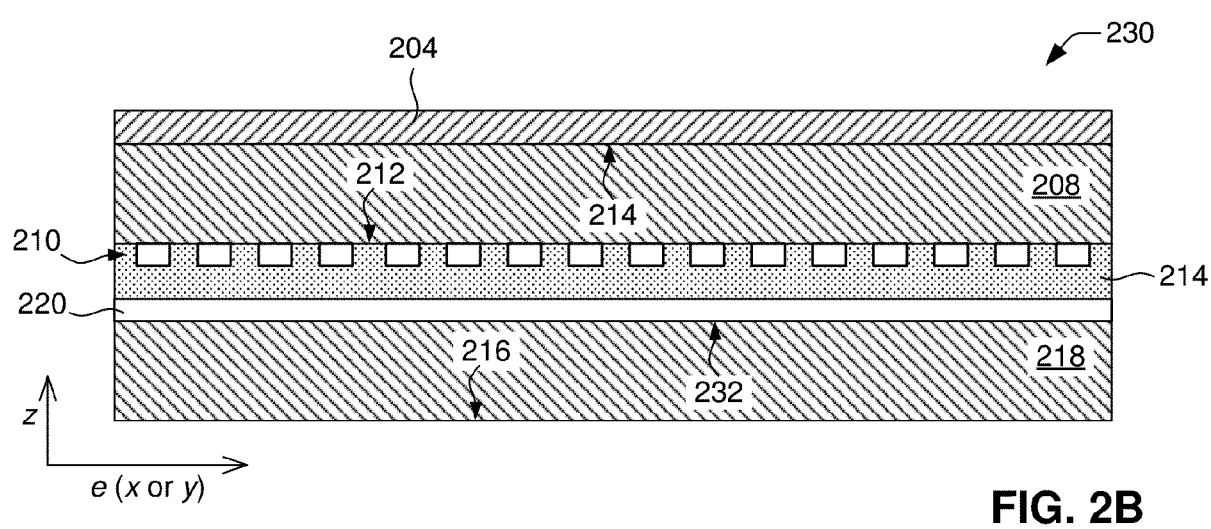
FIG. 2B is a schematic cross-section of another example of a sensing assembly including sense lines and drive lines, in accordance with one or more embodiments of this disclosure.

The relative position of the sense lines 210 and the drive lines 220 can be changed by leveraging another surface of the second substrate 218. To that point, FIG. 2B is a schematic cross-section of an example of a sensing assembly 230 including the sense lines 210 and drive lines 220. The sense lines 210 are assembled on the first surface 212 of the first substrate 208, and the drive lines 220 are assembled on a second surface 232 of the second substrate 218. The sensing assembly 230 also includes the transparent adhesive layer 214 that attaches the first substrate 218 and the second substrate 218. The sensing assembly 230 further includes the touch layer 204 forming the interface 215 with the first substrate 208. As mentioned, in some embodiments, the touch layer 204 may be absent.

Figure 2C:
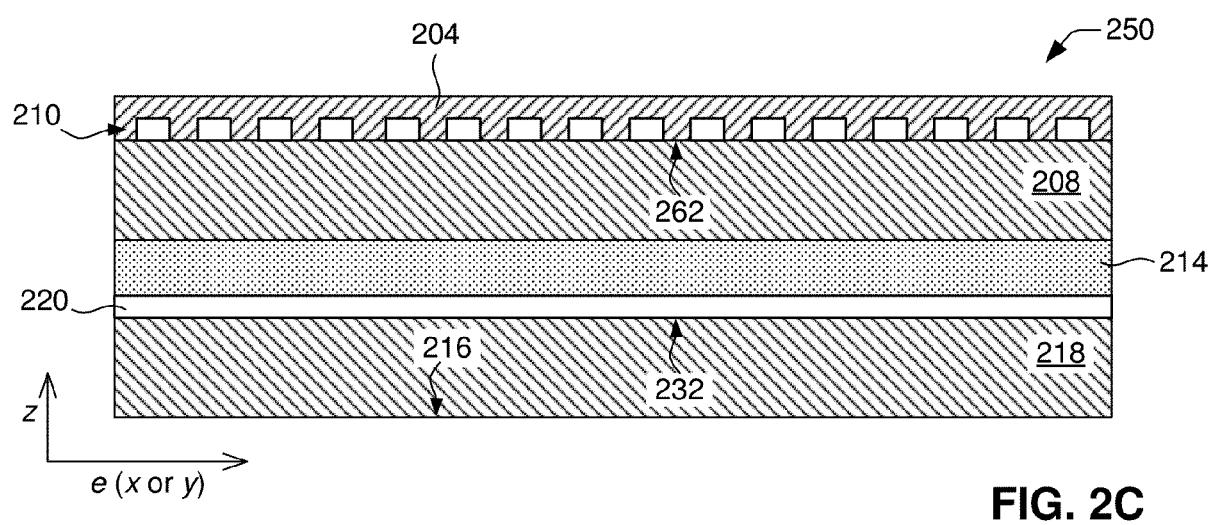
FIG. 2C is a schematic cross-section of yet another example of a sensing assembly including sense lines and drive lines, in accordance with one or more embodiments of this disclosure.

Further, another arrangement of the sense lines 210 and the drive lines 220 can leverage another surface of the first substrate 208. FIG. 2C is a schematic cross-section of an example of a sensing assembly 250 including the sense lines 210 and drive lines 220. The sense lines 210 are assembled on a second surface 262 of the first substrate 208, and the drive lines 220 are assembled on the second surface 232 of the second substrate 218. The second surface 262 is opposite the first surface 212. The sensing assembly 250 also includes the transparent adhesive layer 214 attaching the first substrate 218 and the second substrate 218. The sensing assembly 250 further includes the touch layer 204 forming an interface with the second surface 262 of the substrate 208. As mentioned, in some embodiments, the touch layer 204 may be absent.

Figure 2D:
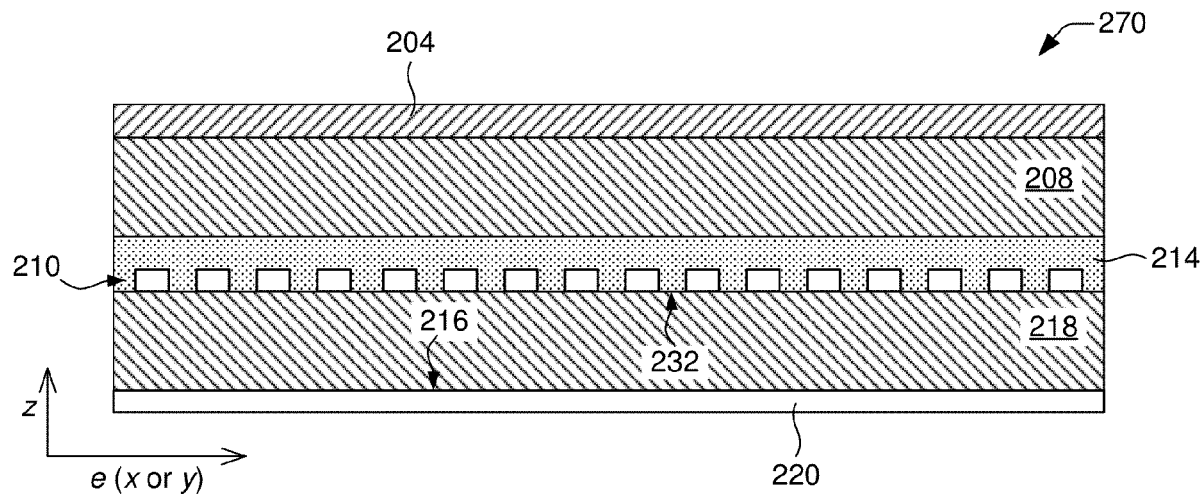
FIG. 2D is a schematic cross-section of yet another example of a sensing assembly including sense lines and drive lines, in accordance with one or more embodiments of this disclosure.

As mentioned, sense lines and drive lines of a touch sensor can be formed on opposite surfaces of a single substrate. FIG. 2D is a schematic cross-section of a sensing assembly 270 where the sense lines 210 and the drive lines 220 are assembled in such a configurationnamely, the sense lines 210 can be assembled on the second surface 232 of the second substrate 218 and the drive lines 220 can be assembled on the first surface 216 of the second substrate 218. In such a configuration, the second substrate 218 embodies a dielectric layer between drive lines 220 and sense lines 210. The sensing assembly 270 also includes the transparent adhesive layer 214 that attaches the first substrate 208 and the second substrate 218. The sensing assembly 270 further includes the touch layer 204 forming the interface 214 with the substrate 208. As mentioned, in some embodiments, the touch layer 204 may be absent. The configuration of the sensing assembly 270 can be referred to as dual-sided single-substrate configuration.

Figure 2E:
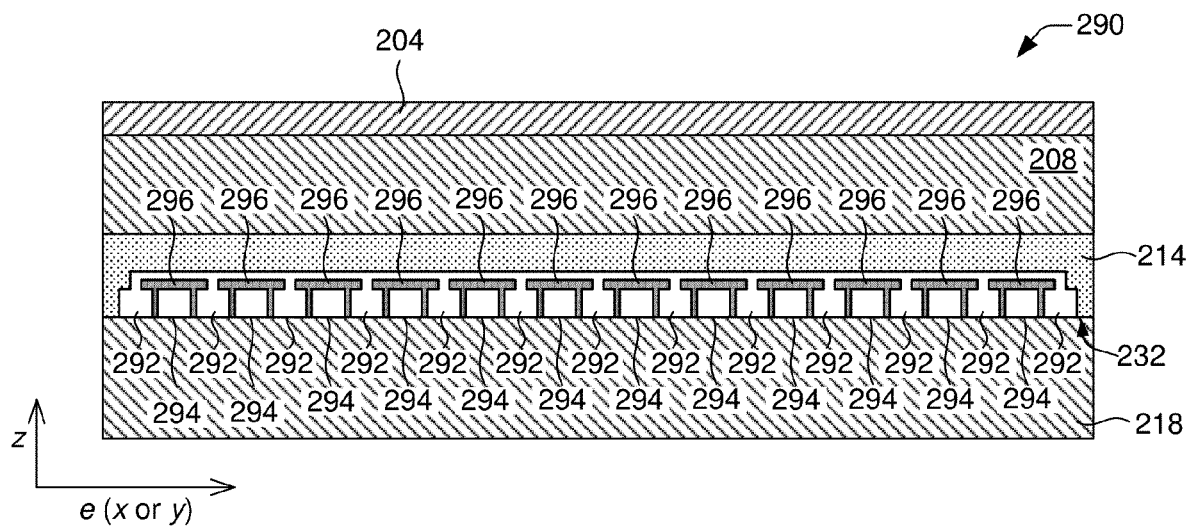
FIG. 2E is a schematic cross-section of still another example of a sensing assembly including sense conductors that constitute a sense line and drive conductors that constitute drive lines, in accordance with one or more embodiments of this disclosure.

In other configurations, sense conductors and drive conductors of a touch sensor can be formed on a same surface of a single substrate. Such a configuration can be referred to as single-sided single substrate configuration. The assembly of sense conductors and drive conductors can include a first array of conductors of a first type (either sense conductors or drive conductors) and a second array of conductors of a second type different from the first type. Each one of the first and second array of conductors can include groups of conductors, each group oriented along a defined direction and adjacent groups oriented essentially parallel to one another. Conductors in the group can be connected by conductive constrictions. The group of conductors in the first array of conductors can be oriented in a direction that is perpendicular to the direction along which the groups of conductors in the second array of conductors are oriented. Thus, the constrictions that connect conductors in one of the first or second array of conductors can be formed on a dielectric bridge that insulates adjacent conductors in that particular array. FIG. 2E illustrates a schematic cross-section of a sensing assembly 290 where sense conductors 292 and drive conductors 294 are assembled in a single-sided single-substrate configuration. As is illustrated in FIG. 2E, a sense conductor 292 and an adjacent drive conductor 294 are separated by a dielectric bridge 296 that can maintain the array of sense conductor electrically insulated from the array of drive conductors. A conductive constriction that overlays the dielectric bridged 296 can electrically connect a first sense conductor 292 and an adjacent second sense conductor 292.

Figure 3A:
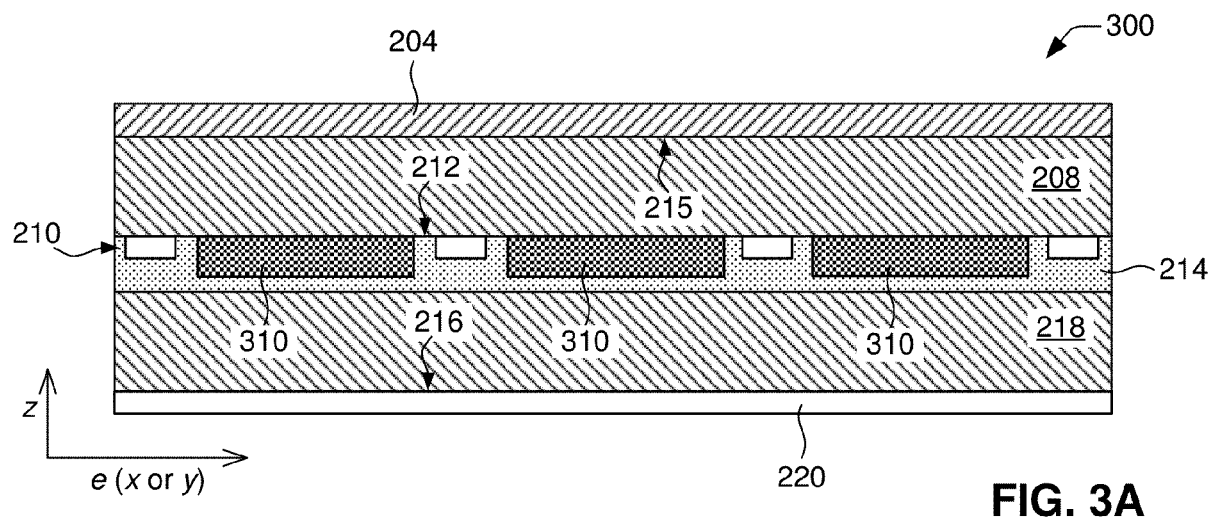
FIG. 3A is a schematic cross-section of an example of a display device that includes a sensing assembly having sense lines and drive lines, in accordance with one or more embodiments of this disclosure.
Figure 3B:
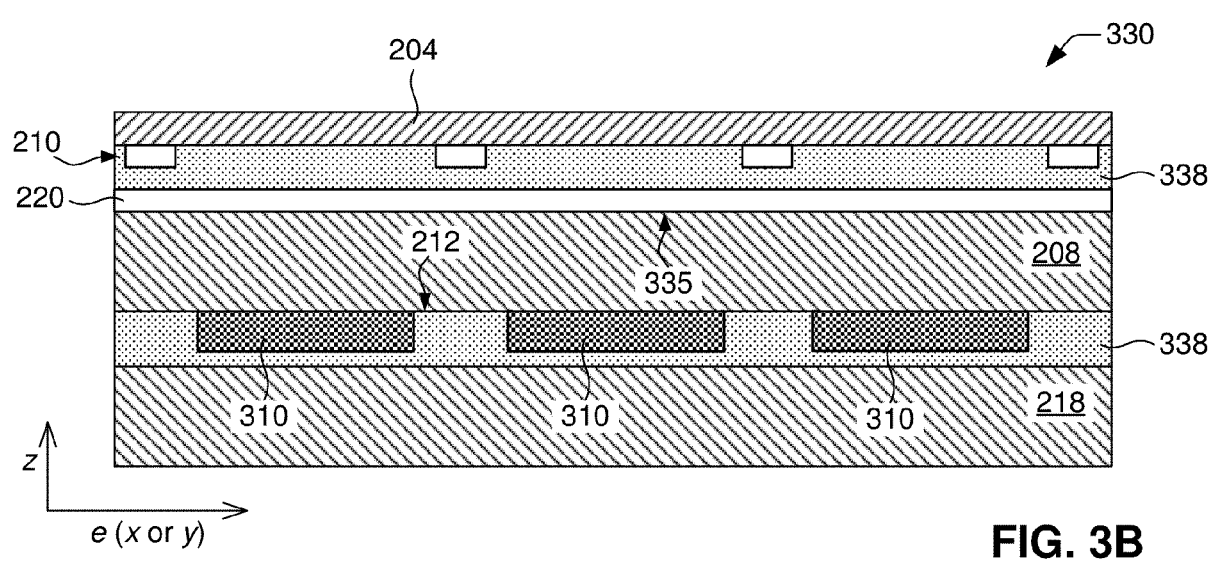
FIG. 3B is a schematic cross-section of another example of a display device that includes a sensing assembly having sense lines and drive lines, in accordance with one or more embodiments of this disclosure.
Figure 3C:
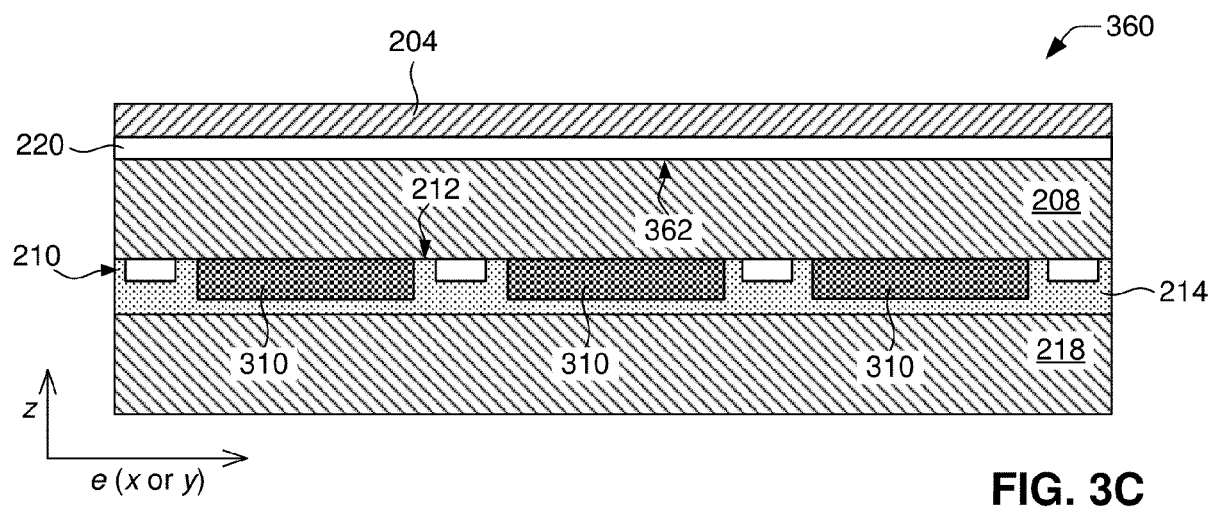
FIG. 3C is a schematic cross-section of yet another example of a display device that includes a sensing assembly having sense lines and drive lines, in accordance with one or more embodiments of this disclosure.

Display elements can be integrated into sensing assemblies described above in order to form a display device having touch sensing functionality. For example, FIG. 3A is a schematic cross-section of a display device 300 that includes several display elements 310 intercalated between sense lines 210. Each display element 310 can be formed on the surface 212 of the first substrate 208. As another example, FIG. 3B is a schematic cross-section of a display device 330 that includes several display elements 310. Each display element 310 can be formed on the surface 212 of the first substrate 208. The drive lines 220 can be assembled on a surface 335 opposite the surface 212. The sense lines 210 can be assembled on a surface of the touch layer 204, the surface being opposite the surface 335. A first transparent adhesive layer 338 attaches the first substrate 208 and the second substrate 218, and a second transparent adhesive layer attaches the first substrate 208 and the touch layer 204. As yet another example, FIG. 3C is a schematic cross-section of a display device 360 that also includes several display elements 310 intercalated between sense lines 210. The sense lines 210 can be assembled on the first surface 212 of the first substrate 208, and the drive lines 220 can be assembled on a second surface 362 of the first substrate 208, where the second surface 362 is opposite the first surface 212.

With further reference to FIG. 1, the sense lines 110 can be connected to a first connector 130 by routing traces 134. Rather than being arranged in a one-to-one configuration where each one of the sense lines 110 is coupled to a respective one of the first routing traces 134, groups of sense lines 110 can be coupled to respective first ones of the routing traces 134. That is, a first group of the sense lines 110 can be coupled to a first routing trace of the routing traces 134, a second group of the sense lines 110 can be coupled to a second routing trace of the routing traces 134, and so forth until all sense lines 110 are electrically coupled to the connector 130. By relying on individual routing traces to route signal from respective groups of sense lines, a greater number of sense lines can be packaged in the touch sensor device without increasing the area of the connecting pad 138. As a result, increased sensitivity of the touch sensor device can be achieved relative to other touch sensor devices that utilize a one-to-one configuration to couple sense lines to the first connector 130.

In some embodiments, each one of the routing traces 134 can be embodied in piecewise rectilinear traces or curved traces depending on the surface of the connecting pad 138. In other embodiments, at least one first routing trace of the routing traces 134 can be embodied in piecewise rectilinear trace(s), and at least one second routing trace of the routing traces 134 can be embodied in curved trace(s). At least sections of respective ones of the routing traces 134 can be assembled to be essentially parallel to one another in order to reduce asymmetric interference. Deviations from a parallel configuration of sections of routing traces 134 also can be present, but two or more of those sections are not necessarily perpendicular. Such deviations can result from assembling the routing traces 134 to reduce conductivity variation amongst a long routing trace (e.g., the longest routing trace) and a short routing trace (e.g., the shortest routing trace). It is noted that number of routing traces 134 is not limited to the number of routing traces 134 depicted in FIG. 1.

A first routing trace of the routing traces 134 can be embodied in metallic pad and a second routing trace of the routing traces 134 can be embodied in a second metallic pad. The metallic pad and the second metallic pad can be formed using any treatment process. The treatment process can be utilized to treat a surface of the connecting pad 138 to form each one of the routing traces 134. In some embodiments, the treatment process can be additive. An example of an additive process is printing, such as printing an amount of Ag ink or an amount of another type of conductive ink on an insulating substrate (such as PET) that embodies the connecting pad 144. In other embodiments, the treatment process can be a subtractive process where an etchant is used to remove a portion of a uniformly conductive planar surface to form a routing trace. The uniformly conductive planar surface can be embodied in a layer that has been coated with metal nanowires, a sputtered metal, an electrodeposited annealed metal, a rolled annealed metal, or similar conductive coating.

Fewer or more routing traces 134 than those shown in FIG. 1 can be assembled in a touch sensor device. Indeed, in some embodiments, at least one trace (not depicted in FIG. 1) can be added to the routing traces 134 to provide perimeter grounding rather than connect to one of the sense lines 110. A trace that provides perimeter grounding can be referred to as a shielding trace. Coupling between such trace(s) and a resistor is absent in those embodiments.

In cases in which the number of routing traces 134 is N (a natural number), the number of sense lines 110 that can be packaged in the touch sensor can be $m(N-1)+1$ because the sense lines 110 have a routing trace at each end of the sensor. Here, m is the number of sense lines present in each group within the sense lines 110. In one embodiment, m = 4 and the number of sense lines 1110 is $4(N-1)+1$.

The drive lines 120 can be coupled to a second connector 140 by routing traces 144. Rather than being arranged in a one-to-one configuration where each one of the drive lines 120 is coupled to a respective one of the routing traces 144, groups of drive lines 120 can be coupled to respective ones of the routing traces 144. That is, a first group of the drive lines 120 can be coupled to a first routing trace of the routing traces 144, a second group of the drive lines 120 can be coupled to a second routing trace of the routing traces 144, and so forth until all drive lines 120 are electrically coupled to the connector 140. Again, by relying on individual routing traces to route signal from respective groups of drive lines, a greater number of drive lines can be packaged in the touch sensor device without increasing the area of the connecting pad 148. As a result, increased sensitivity of the touch sensor device can be achieved relative to commonplace touch sensor devices that utilize a one-to-one configuration to drive lines to the second connector 140.

In some embodiments, each one of the routing traces 144 can be embodied in piecewise rectilinear traces or curved traces depending on the surface of the connecting pad 148.

In other embodiments, at least one first routing trace of the routing traces 144 can be embodied in piecewise rectilinear trace, and at least one second routing trace of the routing traces 144 can be embodied in a curved trace. At least sections of respective ones of the routing traces 144 can be assembled to be essentially parallel to one another in order to reduce asymmetric interference. Deviations from a parallel configuration of sections of routing traces 144 also can be present, but not necessarily perpendicular. Such deviations can result from assembling the routing traces 134 to reduce conductivity variation amongst a long routing trace (e.g., the longest routing trace) and a short routing trace (e.g., the shortest routing trace). It is noted that number of routing traces 144 is not limited to the number of routing traces 144 depicted in FIG. 1.

A first routing trace of the routing traces 144 can be embodied in metallic pad and a second routing trace of the routing traces 144 can be embodied in a second metallic pad. The metallic pad and the second metallic pad can be formed using any treatment process. The treatment process can be utilized to treat a surface of the connecting pad 148 to form each one of the routing traces 144. In some embodiments, the treatment process can be additive. An example of an additive process is printing, such as printing an amount of Ag ink or an amount of another type of conductive ink on an insulating substrate (such as polyethylene terephthalate (PET)) that embodies the connecting pad 148. In other embodiments, the treatment process can be a subtractive process where an etchant is used to remove a portion of a uniformly conductive planar surface to form a routing trace. The uniformly conductive planar surface can be embodied in a layer that has been coated with metal nanowires, a sputtered metal, or similar conductive coating.

Fewer or more routing traces 144 than those shown in FIG. 1 can be assembled in a touch sensor device. Indeed, in some embodiments, at least one trace (not depicted in FIG. 1) can be added to the routing traces 144 to provide perimeter grounding rather than connect to one of the sense lines 110. As mentioned, a trace that provides perimeter grounding can be referred to as a shielding trace. Coupling between such shielding trace(s) and a resistor is absent in those embodiments.

In cases in which the number of routing traces 144 is M (a natural number), the number of drive lines 120 that can be packaged in the touch sensor can be $n \cdot (M-1)+1$ because the drive lines 120 have a routing trace at each end of the sensor. Here, n is the number of drive lines present in each group within the drive lines 120. In one embodiment, n = 4 and the number of drive lines 120 is $4(M-1)+1$.

A group of sense lines can be routed to the connector 130 using resistors that connect sense lines in the group to a routing trace in the connecting pad 134. The resistors are assembled such that each one of the resistors connects a first sense line in the group to an adjacent second sense line in the group, thereby having a resistor per unique pair of sense lines in the group of sense lines. Such resistors are schematically represented by grey ellipses in FIG. 1. The routing trace is coupled (electrically and mechanically) to a single sense line in the group. Similarly, a group of drive lines can be routed to the connector 140 using resistors that connect drive lines in the group to a routing trace in the connecting pad 148. Again, the resistors are assembled such that each one of the resistors connects a first drive line in the group to an adjacent second drive line in the group, thereby having a resistor per unique pair of drive lines in the group of drive lines. Such resistors also are schematically represented by grey ellipses in FIG. 1. The routing trace is coupled (electrically and mechanically) to a single drive line in the group. Although both the group of sense lines and the group of drive lines are illustrated in FIG. 1 as each having three sense lines, the disclosure is not limited in that respect. and several sense lines can be included in the group of sense lines and several drive lines can be included in the group of drive lines. For instance, the group of sense lines can include four sense lines and the group of drive lines can include four drive lines. In such a case, three resistors can be assembled to connect the four sense lines pairwise, and three other resistors can be assembled to connect the four drive lines pairwise.

Figure 4:
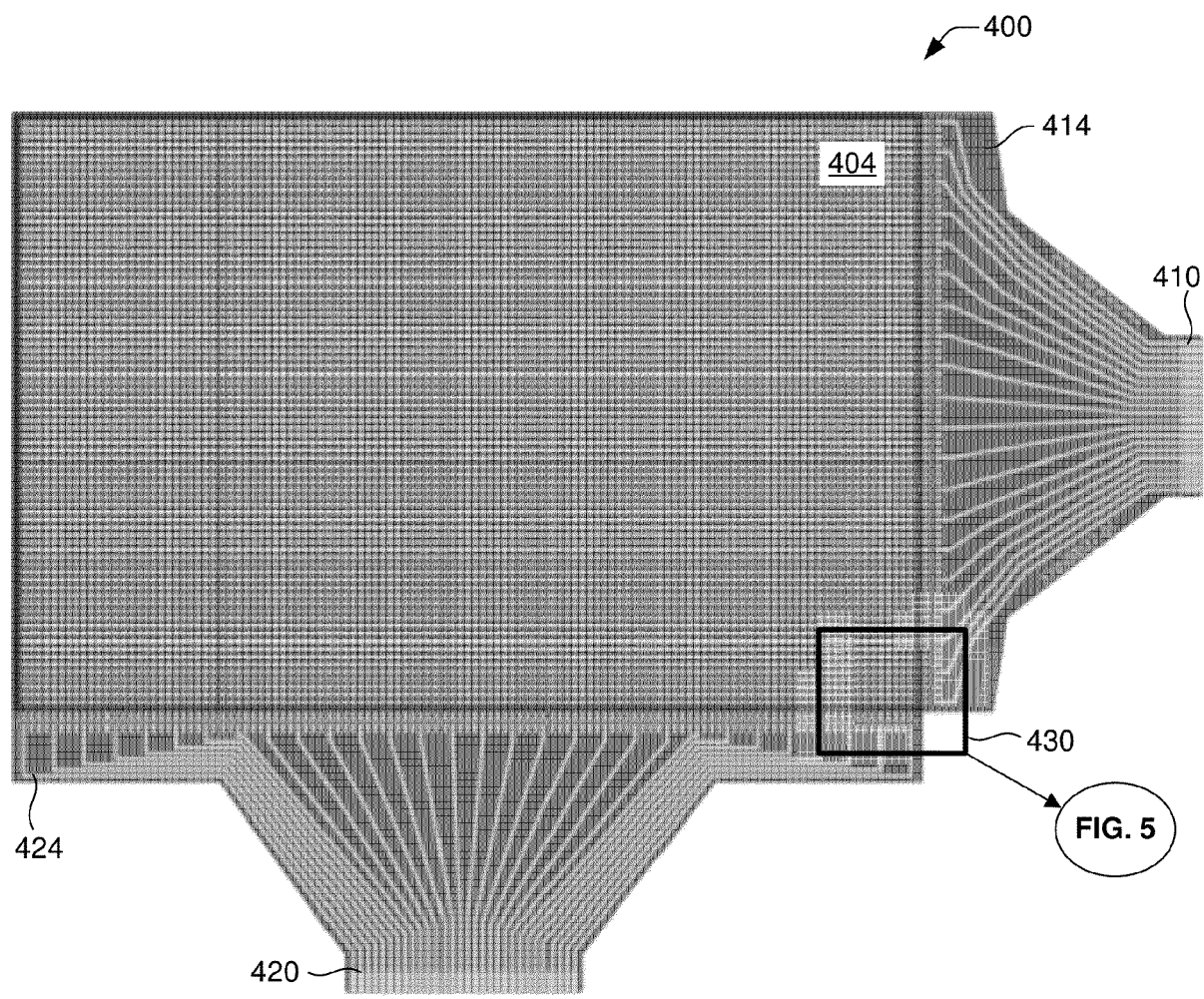
FIG. 4 illustrates an example of a touch sensor device that includes integrated resistors, in accordance with one or more embodiments of this disclosure.

As an example, FIG. 4 illustrates a touch sensor device 400 that includes a sensing area 404 that contains a first array of conductive members and a second array of conductive members. The first array of conductive members can embody an array of sense lines (such as sense lines 110) and the second array of conductive members can embody an array of drive lines (such as drive lines 120). The touch sensor device 400 also includes a first connector 410 and a second connector 420 coupled to a first connecting pad 414 and a second connecting pad 424, respectively. The first connecting pad 414 and the second connecting pad 424 include first connecting traces and second connecting traces, respectively.

Rather than individually connecting the sense lines 110 to respective ones of the first connecting traces, groups of sense lines are connected to respective routing traces. That is, multiple sense lines that constitute a group are connected to a single routing trace of the first connecting traces. The number of the multiple sense lines that constitute a group of sense lines is m = 4, simply as an illustration. Similarly, rather than individually connecting the drive lines 120 to respective ones of the second connecting traces, groups of drive lines are connected to respective connecting traces. That is, multiple drive lines that constitute a group are connected to a single connecting trace of the second connecting traces. The number of the multiple sense lines that constitute a group of sense lines also is n = 4, simply as an illustration.

Both sense lines and drive lines can be referred to as conductive members. A resistor can couple (electrically and mechanically, for example) a routing trace to multiple conductive members constituting a group of conductive members. Further, other resistors can connect respective pairs of adjacent conductive members in the group of conductive members. As such, in some embodiments, multiple resistors can be formed at a periphery of the sensing area 404, each one of the resistors connecting a group of conductive members to a respective routing trace. This disclosure, however, is not limited in that respect. Indeed, in some embodiments, the resistors can be formed within the sensor area 404. In other embodiments, the resistors can be formed within the connecting pad (either the connecting pad 414 or the connecting pad 424) that includes the conductive members.

Regardless of placement of a resistor on the touch sensor device 440, in some embodiments, the resistor can be formed by depositing an electrically resistive material on a section of each one of the multiple conductive members (sense lines and drive lines) that form a group. Depositing the electrically resistive material can include printing carbon, for example. The electrically resistive material can be deposited in an additional deposition stage or as part of a formation stage of the conductive members (sense lines or drive lines). It is noted that, in some embodiments, the electrically resistive material can be deposited on the connecting pad 414 before the conductive members are deposited or otherwise formed.

Figure 5:
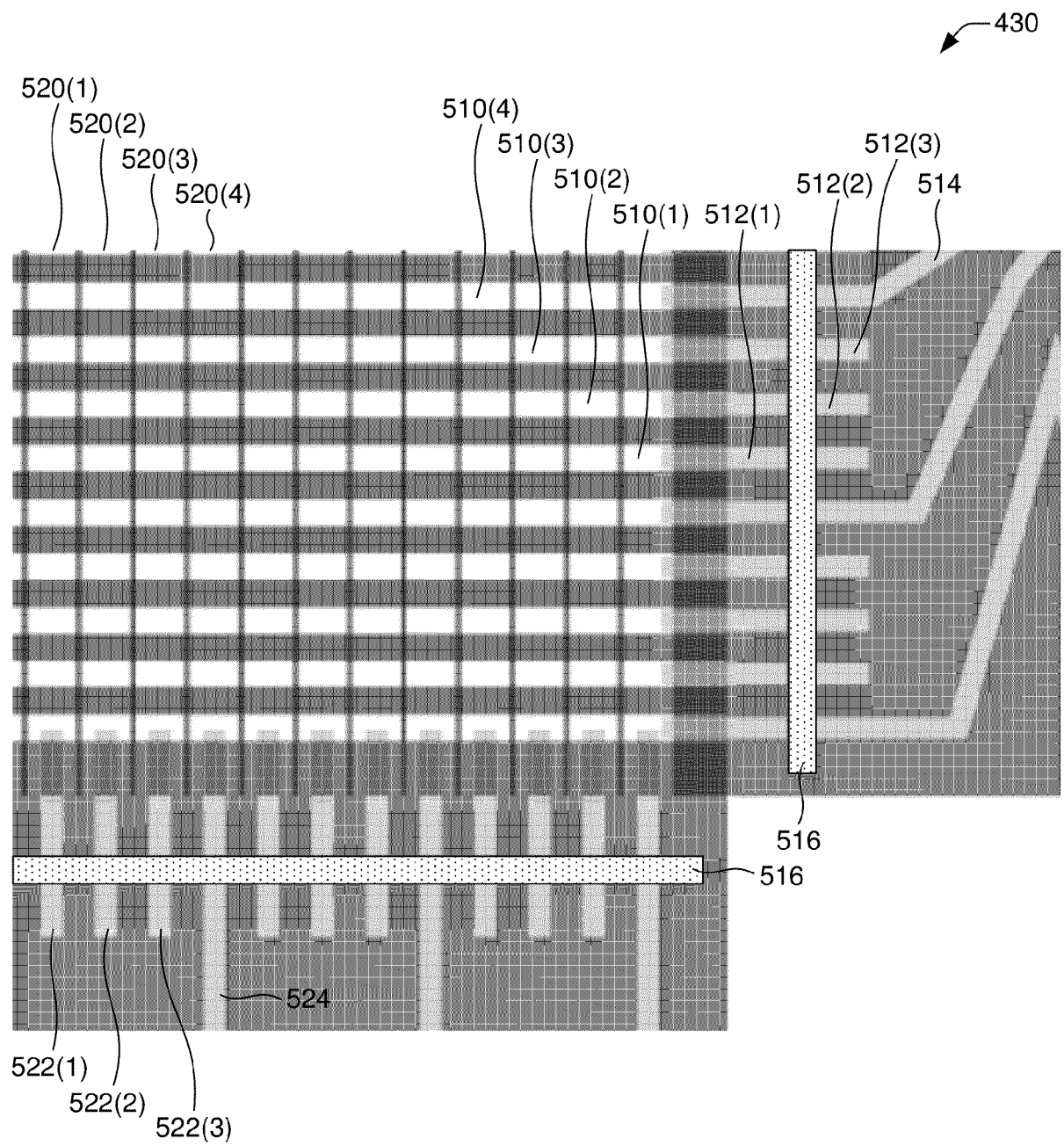
FIG. 5 illustrates a section of the touch sensor device shown in FIG. 4.

For purposes of illustration, FIG. 5 presents a section 430 of the touch sensor device 400. Each group of sense lines includes a first sense line 510(1), a second sense line 510(2), a third sense line 510(3), and a fourth sense line 510(4). Each group of sense lines is coupled to a routing trace that extends to the first connector 410 (FIG. 4). To that end, as is illustrated in FIG. 5, a first conductive trace 512(1) can be coupled to the first sense line 510(1), a second conductive trace 512(2) can be coupled to the second sense line 510(2), and a third conductive trace 512(3) can be coupled to the third sense line 510(3). In addition, one of the sense lines in the group of sense lines can be coupled to a routing trace 514; for example, the routing trace 514 can be coupled to the fourth sense line 510(4). Further, a printed carbon resistor 516 can connect the conductive trace 512(1), the conductive trace 512(2), the conductive trace 512(3), and the routing trace 514. The printed carbon resistor 516 extends across the entire span of the connecting pad 414 (FIG. 4). The printed carbon resistor 516 can have a cross-section that yields a resistance between adjacent sense lines in a range from about 100 - 10000 ohms. In some cases, that resistance can have a magnitude in a range from about 100 Ω to about 10000 Ω. The cross-section can have one of several geometries yielding a desired resistance. In one example embodiment, the cross-section can be a rectangular area having a first side having a length in a range from about 5 μm to 10 μm, and a second side having a length in a range from about 50 μm to about 1.5 mm. It is noted that the geometry of the cross-section also can be dictated by a deposition technique and/or type of material (e.g., a carbon ink, such a graphite ink) used to form the printed carbon resistor 516. In an alternate embodiment, the resistor is an added material, for example, deposited carbon. In this embodiment, the resistor is formed in the same plane as the conductor, and in a predetermined configuration, and can be formed by using a mask.

Each group of drive lines includes a first drive line 520(1), a second drive line 520(2), a third drive line 520(3), and a fourth drive line 520(4). Each group of drive lines is coupled to a routing trace that extends to the first connector 410 (FIG. 4). To that end, as is illustrated in FIG. 5, a first conductive trace 522(1) can be coupled to the first drive line 520(1), a second conductive trace 522(2) can be coupled to the second drive line 520(2), and a third conductive trace 522(3) can be coupled to the third drive line 520(3). In addition, one of the drive lines in the group of drive lines can be coupled to a routing trace 524; for example, the routing trace 524 can be coupled to the fourth drive line 520(4). Further, a carbon resistor 516 can connect the conductive trace 522(1), the conductive trace 522(2), the conductive trace 522(3), and the routing trace 524. The printed carbon resistor 516 extends across the entire span of the connecting pad 424 (FIG. 4). The printed carbon resistor 516 can have a cross-section that yields a resistance between adjacent drive lines in a range from about 100 Ω to about 10000 Ω. In some cases, that resistance can have a magnitude in a range from about 100 Ω to about 10000 Ω.

It is noted that the disclosure is not limited to printed carbon resistors, such as printed carbon pad of a defined geometry. Indeed, in some embodiments, a printed pad of a resistive material can replace the printed carbon resistor 516. The type of resistive material (e.g., a resistive ink or a ceramic-metal composite) and the geometry of the printed pad can yield a resistance in a range from about 100 Ω to about 10000 Ω.

Figure 6:
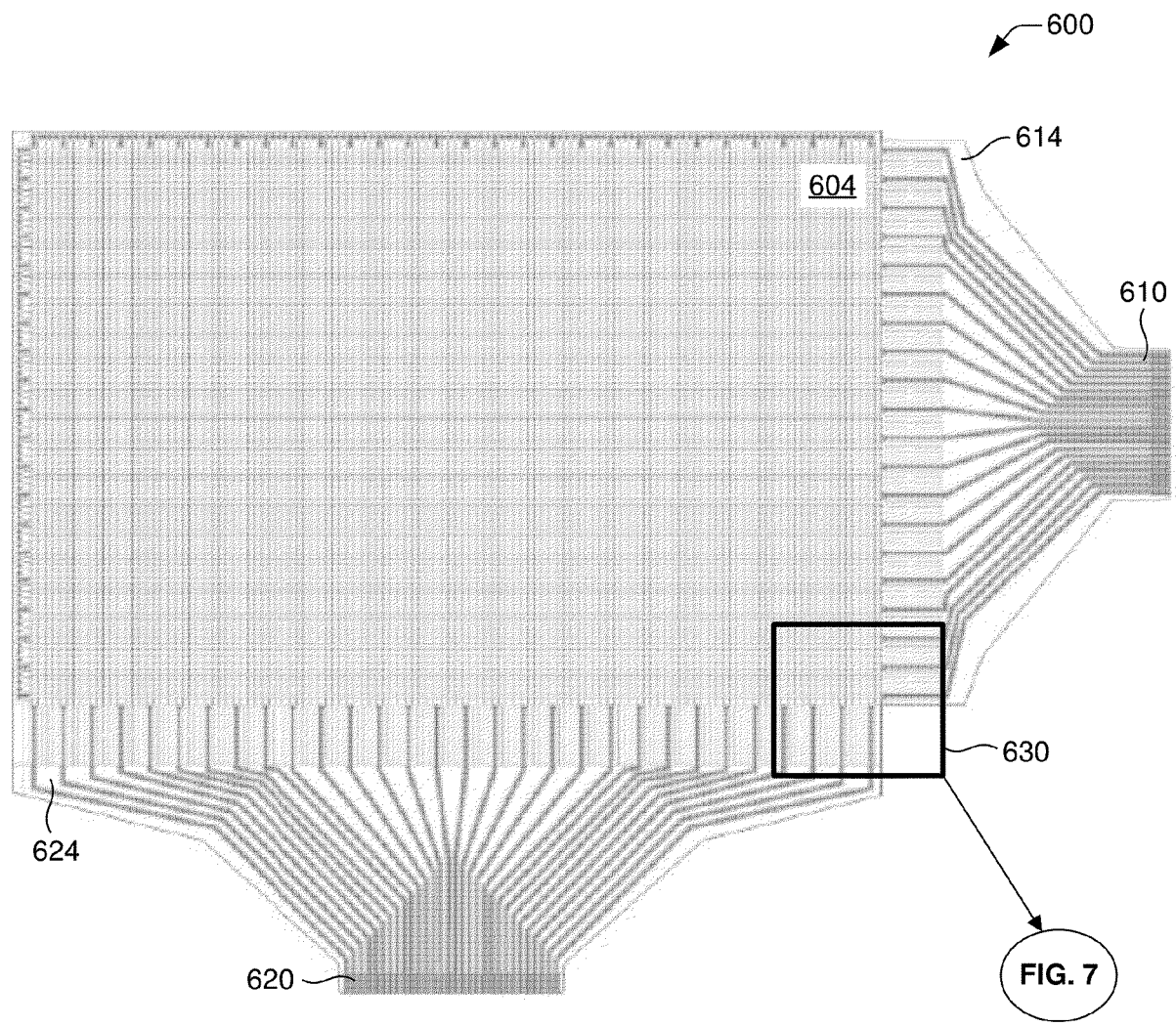
FIG. 6 illustrates another example of a touch sensor device that includes integrated resistors, in accordance with one or more embodiments of this disclosure.

In some embodiments, a resistor that connects adjacent sense lines or adjacent drive lines can be formed on a section of a connecting pad of a touch sensor device, where the section can be proximate to a perimeter of a sense area of the touch sensor device. As an example, FIG. 6 illustrates a touch sensor device 600 that includes a sensing area 604 that contains a first array of conductive members and a second array of conductive members. The first array of conductive members can embody an array of sense lines (such as sense lines 110) and the second array of conductive members can embody an array of drive lines (such as drive lines 120). The touch sensor device 600 also includes a first connector 610 and a second connector 620 coupled to a first connecting pad 614 and a second connecting pad 624, respectively. The first connecting pad 614 and the second connecting pad 624 include first connecting traces and second connecting traces, respectively.

Figure 7A:
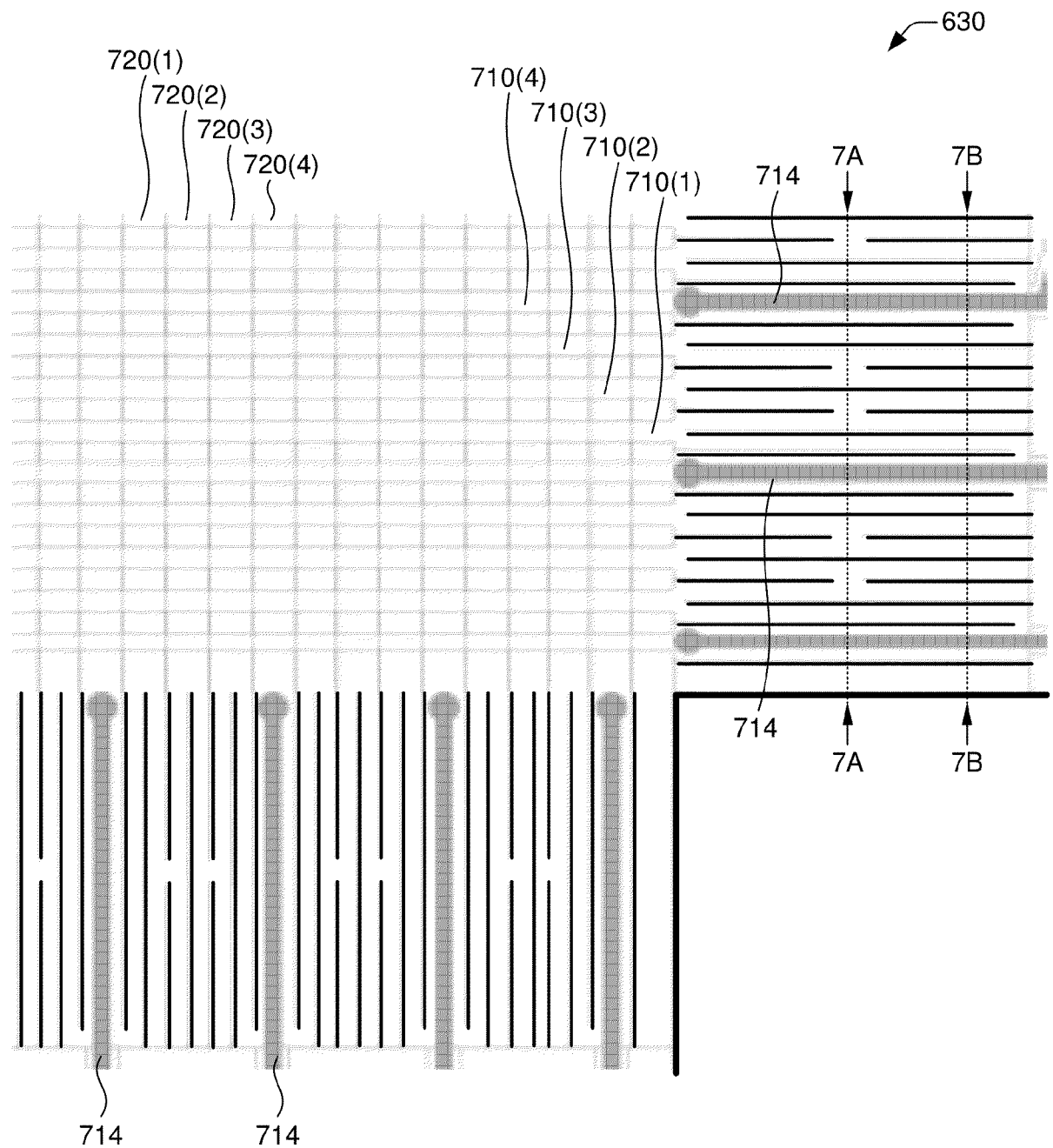
FIG. 7A illustrates a section of the touch sensor device shown in FIG. 6.
Figure 7B:
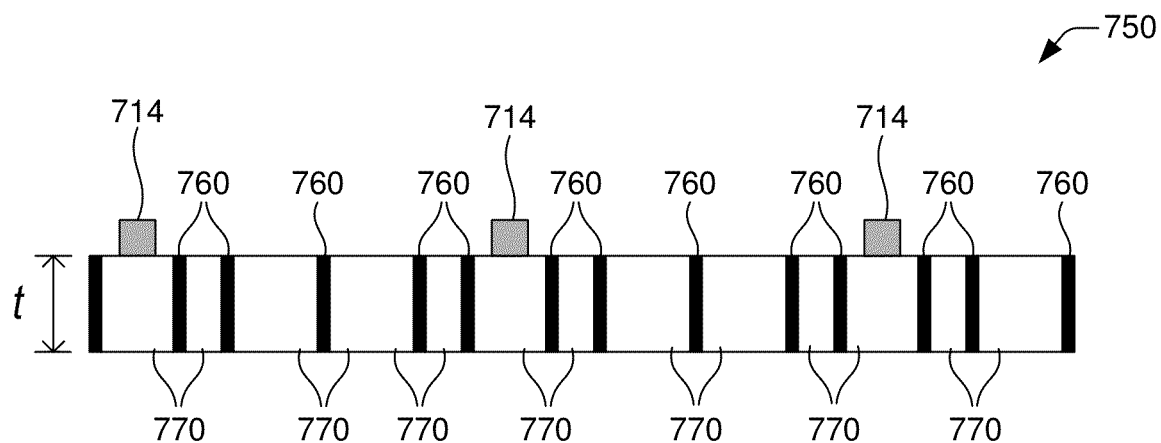
FIG. 7B illustrates a cross-sectional view of the section shown in FIG. 7A.

For purposes of illustration, FIG. 7A presents a section 630 of the touch sensor device 600. Each group of sense lines includes a first sense line 710(1), a second sense line 710(2), a third sense line 710(3), and a fourth sense line 710(4). Each group of sense lines is coupled to a routing trace 714 that extends to the first connector 610 (FIG. 6). To that end, as is illustrated in FIG. 7A, a first routing trace 714 can be coupled to the fourth sense line 710(4), where the first routing trace 714 is separated from an adjacent second routing trace 714 by a conductive layer having a pattern of insulating members integrated therein. The first routing trace 714 and the second routing trace 714 are substantially parallel to one another. The conductive layer can be embodied in a thin film of uniform thickness t. The magnitude of t can range from about 10 μm to 100 μm, for example. FIG. 7B illustrates a cross-sectional view 750 along a line (shown as a dashed line labeled "7A" in FIG. 7A) that perpendicularly intersects the first routing trace 714 and the second routing trace 714. As is illustrated in FIG. 7B, the conductive layer includes an arrangement of multiple insulating members 760 intercalated between sections 770 of the conductive layer. The multiple insulating members 760 could be formed via numerous processes. Examples of those processes include physical/mechanical removal, chemical etching in whole or in part, or a phase change to create electrical isolation.

Figure 7C:
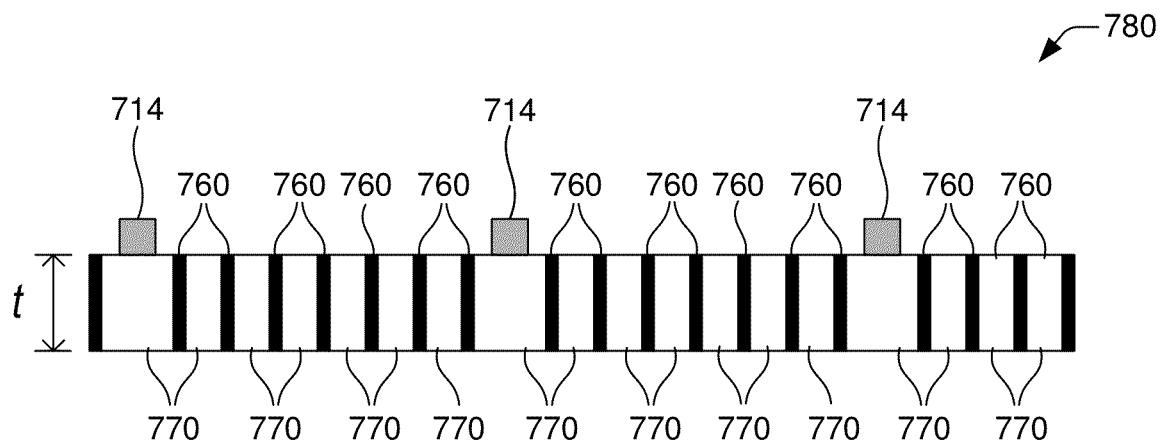
FIG. 7C illustrates another cross-sectional view of the section shown in FIG. 7A.

Additionally, FIG. 7C illustrates a cross-sectional view 780 across another line (shown as a dotted line labeled "7C" in FIG. 7A) that also perpendicularly intersects the first routing trace 714 and the second routing trace 714. The conductive layer includes a second arrangement of multiple insulating members 760 intercalated between sections 770 of the conductive layer. The difference between the first arrangement and the second arrangement is determined by the constrictions present in the pattern of insulating members.

In some embodiments, the conductive layer can be formed from a transparent conductor material. In other cases, the conductive layer can be formed from a non-transparent (e.g., translucent or opaque) conductor material. Indeed, as mentioned, the touch sensor device 600 need not be transparent. Hence, in some embodiments, the conductive layer can be formed from a metal (e.g., Al, Cu, Pt, or Au), a metal alloy, or another type of non-transparent conductive material.

The insulating members within the conductive layer can be parallel to the first routing trace 714. The pattern of insulating members defines multiple constrictions, and also creates a piecewise rectilinear pathway of a conductive material by intercalating the insulating members in the conductive layer according to the pattern. Thus, the pattern of insulating members can form an electrically resistive pathway between the first routing trace 714 and the second routing trace 714. The electrically resistive pathway embodies a resistor that connects the sense lines in the group —e.g., first sense line 710(1), a second sense line 710(2), a third sense line 710(3)— to a routing trace 714. The type of conductive material that forms the conductive layer, and the layout of insulating members in the pattern can determine the resistance of the resistor. The conductive material and the layout of insulating members yield a resistance between adjacent routing traces in a range from about 100 Ω to about 10000 Ω. In some cases, that resistance can have a magnitude in a range from about 100 Ω to about 4000 Ω.

For further illustration, as is shown in the section 630 in FIG. 7A, the touch sensor device 600 also includes groups of drive lines. Each group of drive lines includes a first drive line 720(1), a second drive line 720(2), a third drive line 720(3), and a fourth drive line 720(4). Each group of drive lines is coupled to a routing trace 714 that extends to the second connector 620 (FIG. 6). To that end, as is illustrated in FIG. 7A, a first routing trace 714 can be coupled to the fourth drive line 720(4), where the first routing trace 714 is separated from an adjacent second routing trace 714 by a conductive layer having a pattern of insulating members integrated thereon. The conductive layer can be formed from a conductive material. In some embodiments, the conductive material can be embodied in a TCO or another type of transparent conductor. In other embodiments, the conductive material can be embodied in a translucent conductor or an opaque conductor.

The first routing trace 714 and the second routing trace 714 are substantially parallel to one another. The insulating members can be parallel to the first routing trace 714. The pattern of insulating members defines multiple constrictions, thus forming an electrically resistive pathway between the first routing trace 714 and the second routing trace 714. The electrically resistive pathway embodies a resistor that connects drive lines in the group—e.g., first drive line 720(1), a second drive line 720(2), and third drive line 710(3) — to a routing trace 714. The type of conductive material that forms the conductive layer and the layout of insulating members in the pattern can determine the resistance of the resistor. The conductive material and the layout of insulating members yield a resistance between adjacent routing traces in a range from about 100 Ω to about 10000 Ω. In some cases, that resistance can have a magnitude in a range from about 100 Ω to about 4000 Ω.

Figure 8A:
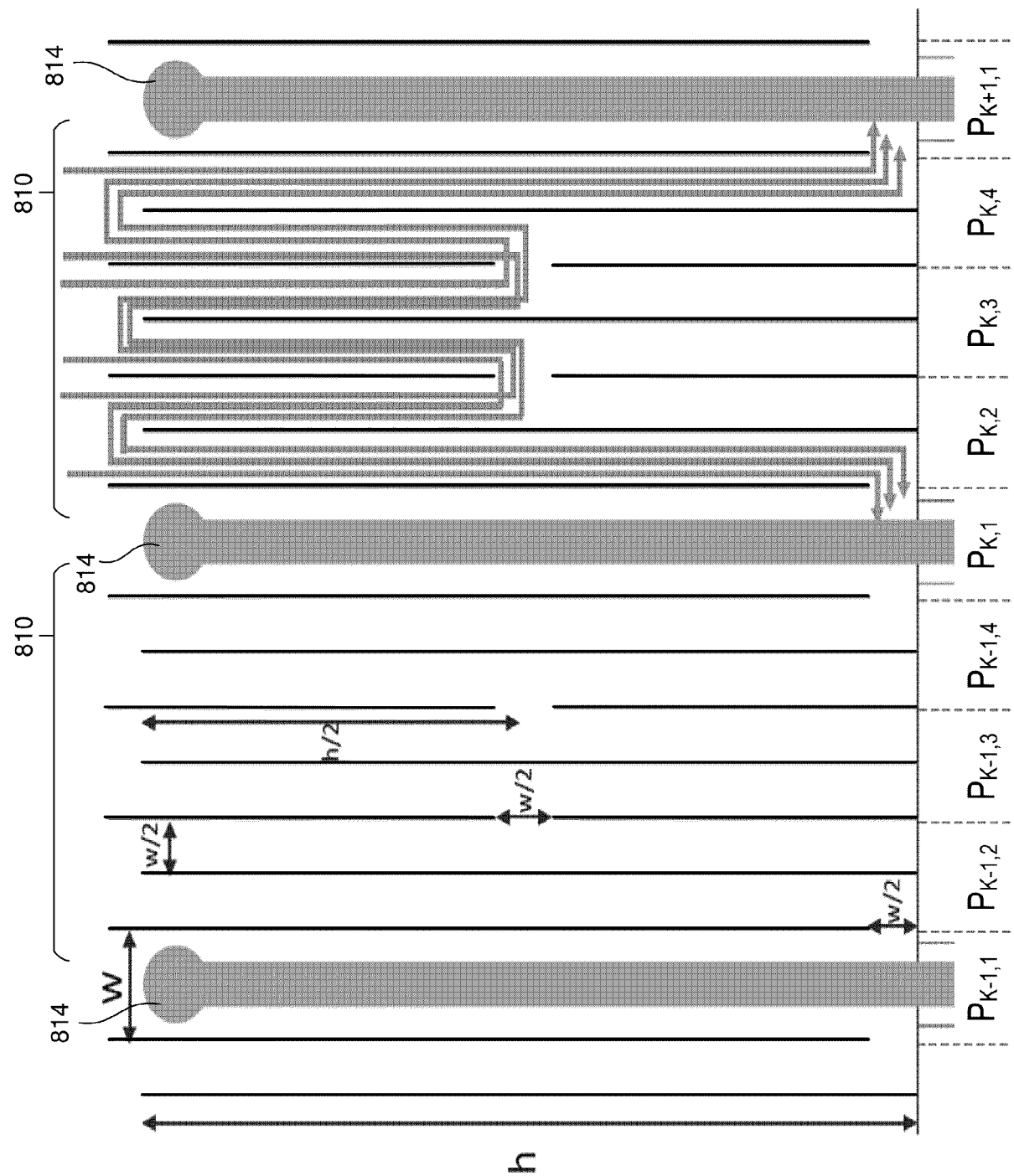
FIG. 8A illustrates another section of the touch sensor device shown in FIG. 7A, the illustrated section including two integrated resistors, in accordance with one or more embodiments of this disclosure.

FIG. 8A illustrates examples of adjacent integrated resistors formed from respective patterns of insulating members integrated into a conductive layer, in accordance with one or more embodiments of this disclosure. The integrated resistors can be assembled in a connecting pad connected to a connector and sense lines or the connector and drive lines of a touch sensor device. A first integrated resistor 810 can electrically couple a first routing trace 814 and a second routing trace 814 adjacent to the first routing trace 814. A second resistor 810 can electrically couple the second routing trace 814 and a third routing trace 814 adjacent to the second routing trace 814. A particular electric pathway can be formed between a conductive member and a routing trace 814. In the illustrated example, for the sake of nomenclature, the first routing trace 814 is indexed as K-1, the second routing trace 814 is indexed as K, and the third routing trace is indexed as K+1. Here, K is a natural number. Each of those routing traces can be associated with a group of conductive members (see FIG. 7A). As is shown in FIG. 8A, the exemplified group of conductive members includes four conductive members (sense lines or drive lines) indexed from 1 to 4. Accordingly, conductive members in FIG. 8A can be indexed with a composite index (p,q), where p identifies a routing trace and q identifies a conductive member in a corresponding group. As such, in an example nomenclature, each conductive member can be labeled $P_{p,q}$, where p = K-1, K, K+1 and q = 1, 2, 3, 4.

Figure 8B:
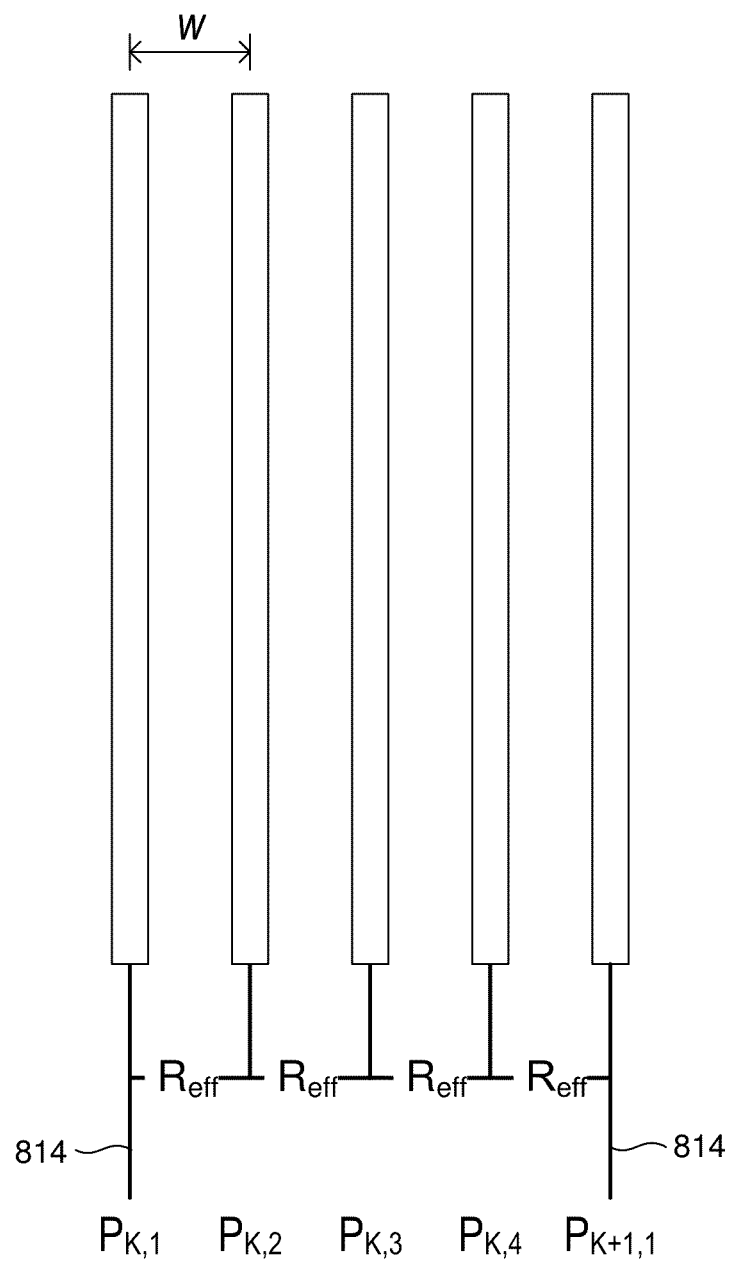
FIG. 8B illustrates an effective assembly of internal resistors corresponding to an integrated resistor shown in FIG. 8A.

A resistance R between a conductive member $P_{p,q}$ and another conductive member $P_{p,1}$, with q > 1, can be determined by adding the electric resistance of each leg of the shortest resistive pathway Π in the integrated resistor from $P_{p,1}$ to $P_{p,q}$. To that end, a number of squares NΠ present in the pathway Π can be determined, and that number can be multiplied by a Ohms per square (OPS). Because of both the particular layout of constrictions in the pattern of insulating members and the uniform separation w/2 between insulating members within an integrated resistor 810, the number of squares NΠ can be equal to the sum of the number σ of squares in a pathway leg of Π and the number of pathway legs (or hops) between a conductive member and the conductive trace 814. Resistive pathways between $P_{K,2}$ and $P_{K,1}$, $P_{K,3}$ and $P_{K,1}$, and $P_{K,4}$ and $P_{K,1}$, are shown in FIG. 8A. Also shown in FIG. 8A are resistive paths between $P_{K,2}$ and $P_{K+1,1}$, $P_{K,3}$ and $P_{K+1,1}$, and $P_{K,4}$ and $P_{K+1,1}$. Thus, for the integrated resistor illustrated in FIG. 8A, the resistance $R_{2,1}^{(K)}$ between $P_{K,2}$ and $P_{K,1}$ is OPS(2h/w); the resistance $R_{3,1}^{(K)}$ between $P_{K,3}$ and $P_{K,1}$ is OPS[2(2h/w)]; and the resistance $R_{4,1}^{(K)}$ between $P_{K,4}$ and $P_{K,1}$ is OPS[3(2h/w)]. As is illustrated in FIG. 8A, w corresponds to the pitch of the array of conductive members and h is a length of an insulating trace in the pattern of insulating trances. Therefore, as is illustrated in FIG. 8B, each one of integrated resistor 810 can be represented by an equivalent chain of resistors $R_{eff}$ in series, where each resistor $R_{eff}$ has a resistance OPS(2h/w). Simply for purposes of illustration, in cases in which w = 1 mm and OPS = 60 Ω/sq, the length h can be configured to 8.333 mm in order to achieve $R_{eff}$ = 1000 Ω.

Figure 9:
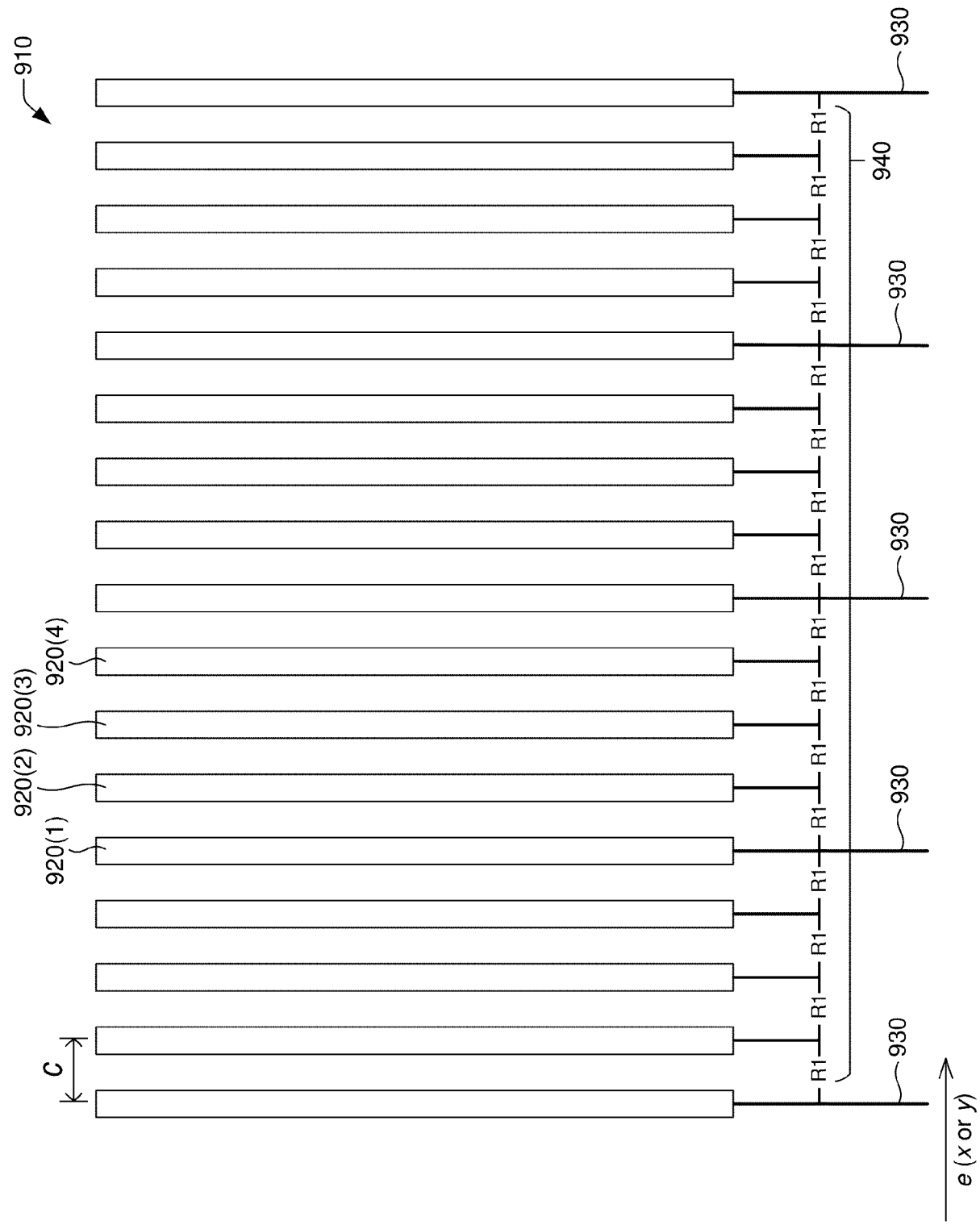
FIG. 9 illustrates an example of an array of conductive members coupled by integrated resistors, the conductive members can embody sense lines or drive lines of a touch senor device, in accordance with one or more embodiments of this disclosure.

FIG. 9 illustrates an example of an array of conductive members 910 that can embody sense lines or drive lines, in accordance with one or more embodiments of this disclosure. Similar to other assemblies of sense lines (e.g., sense lines 110 (FIG. 1)) or drive lines (e.g., drive lines 120 (FIG. 1), the conductive members 910 form a periodic structure along an e direction, where the periodic structure has a defined pitch c. The defined pitch c has a magnitude in a range from about 50 μm to about 5 mm. In one example, c can be equal to 1 mm. The e direction can be one of x direction or y direction. As is shown in FIG. 9, simply for the sake of illustration, the conductive members 910 can be logically grouped into groups containing four conductive members. As mentioned, the disclosure is not limited in that respect and groups having fewer or greater than four conductive members can be formed. One of the conductive members in a group can be coupled (mechanically and electrically) to a first routing trace 930 that extends to a connector (not depicted in FIG. 9). The remaining conductive members in the group can be coupled (electrically and mechanically) to one another and to the first routing trace 930 by one or multiple resistors in a series of resistors 940. The first routing trace 930 also can be coupled to a second routing trace 930 by a series of resistors 940.

More specifically, a first group of conductive members can include a first conductive member 920(1), a second conductive member 920(2), a third conductive member 920(3), and a fourth conductive member 920(4). The first conductive member 920(1) is coupled to the first routing trace 930, and the fourth conductive member 920(4) is coupled to the second routing trace 930. The second conductive member 920(2), the third conductive member 920(3), and the fourth conductive member 920(4) are connected to one another by one or more resistors of the series of multiple resistors 940, each resistor generically denoted by "R1" in FIG. 9 simply for the sake of representation. In some embodiments, each resistor in the series of multiple resistors 940 can be formed by extending a length of a conductive member in the array of conductive members 910 in order to achieve a desired electrical resistance. Such extension is represented in FIG. 9 by straight segments that are collinear with respective conductive members.

The number of routing traces coupled to the array of conductive members 910 can be reduced by adding a set of one or more second resistors to the connecting pad that includes the multiple series of resistors 940. At least a subset of the multiple series of resistors 940 can be nested within the set of resistor(s). Each resistor in the set of second resistor(s) couples a first routing trace to a second routing trace. The number of resistors in the set of second resistor(s) can determine the degree of reduction in the number of routing traces. Nesting can be continued by adding a set of one or more third resistors to the connecting pad that includes the multiple series of resistors 940 and the set of second resistor(s), where the set of second resistor(s) and the multiple series of resistors 940 are nested within the set of third resistor(s). The additional nesting yields further reduction of the number of routing traces coupled to the array of conductive members 910.

Figure 10:
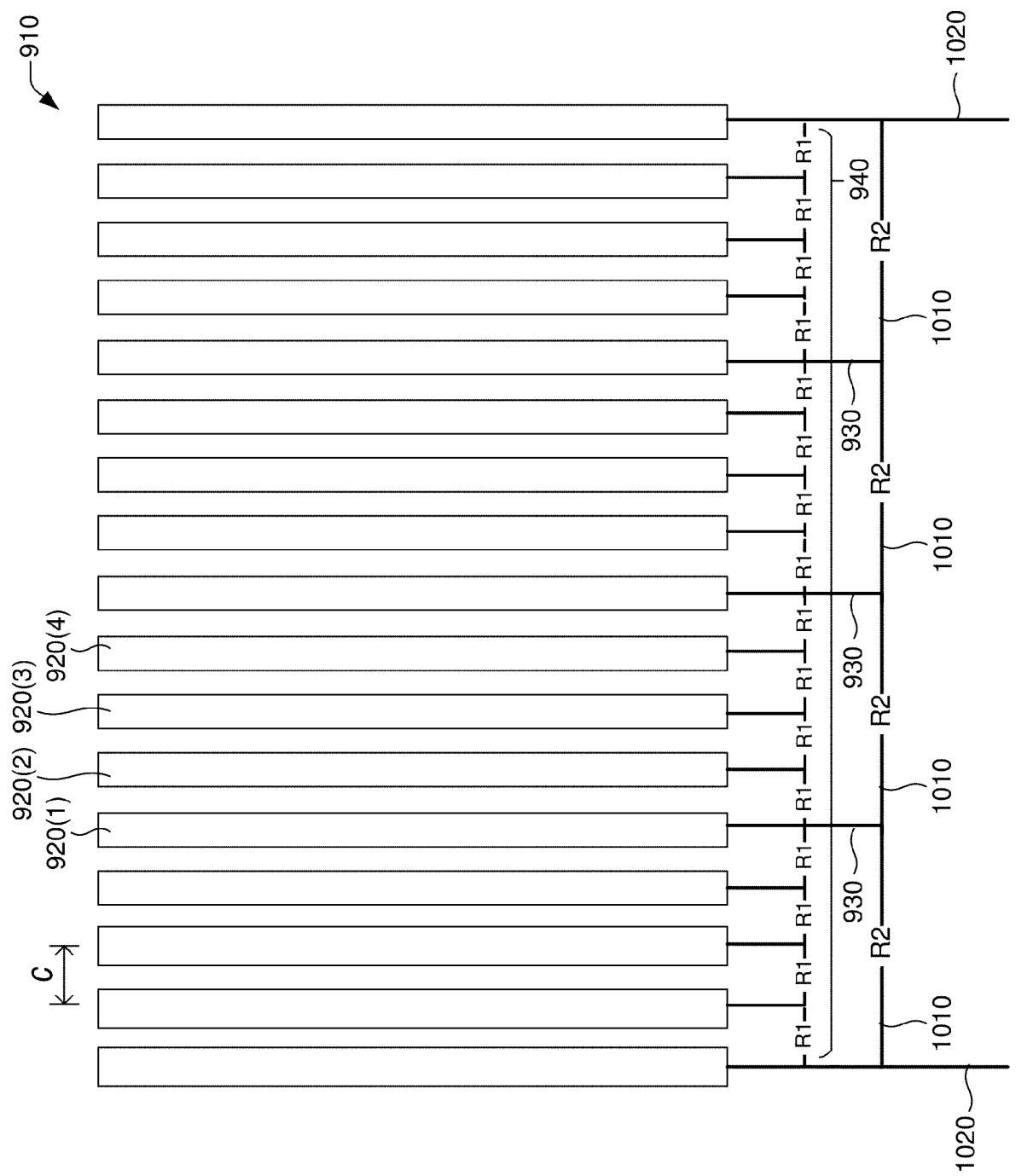
FIG. 10 illustrates another example of an array of conductive member coupled by integrated resistors arranged in a nested spatial relationship, the conductive members can embody sense lines or drive lines of a touch senor device, in accordance with one or more embodiments of this disclosure.

An example of nested resistors is shown in FIG. 10. The multiple series of resistors 940 are nested inside a set of resistors 1010. The set of resistors 1010 includes a first resistor 1010, a second resistor 1010, a third resistor 1010, and a fourth resistor 1010 connected in series, each coupling adjacent routing traces 930 by forming an electric pathway between the adjacent routing traces 930. The set of resistors 1010 also couples (mechanically and electrically) a first routing trace 1020 and a second routing trace 1020 adjacent to the second routing trace 1020. In some embodiments, each one of the resistors in the set of resistors 1010 can have a resistance R2 that is a multiple of the resistance of a resistor in the multiple series of resistors 940. The multiplicity can be greater than 2, in some cases. For example, the multiplicity can range from 2 to 10 and, in some in some configurations, the multiplicity can be 100. It is noted that the magnitude of the resistance R2 can be constrained to be less than q·R1, where R1 is the magnitude of each one of resistors 940 and q is the number of resistors 940 between two conductive routing traces 1020—e.g., in FIG. 10, magnitude of R2 is less 16R1. Further, for purposes of ease of spatial resolution of touch signal in a touch sensor device that includes the array of conductive members 910, the magnitude of R2 can be configured to be the same as, or less than, the magnitude of R1 (e.g., R2 = R1). In cases where the magnitude of R2 is equal to q·R1 there would be no difference in sensing readings by adding the nest tier including R2. In cases where the magnitude of R2 is greater than q·R1, current can circulate through a path of least resistance, passing through R1 only. The resistance of a resistor 1010 can have a magnitude in a range from about 100 Ω to about 10000 Ω. In some cases, that resistance can have a magnitude in a range from about 100 Ω to about 10000 Ω.

As mentioned, nesting of resistors could be continued up until available area in the connective pad that contains the resistors R1 and R2 has been exhausted. The number of conductive members contained in the outermost tier increases with number of nested tiers. Accordingly, the number of conductive members (sense lines or drive lines) that are resolved increases, As is shown in FIG. 10, the addition of a tier of nested resistors R2 results in a transition from four conductive members per routing trace to 16 conductive members per routing trace. Thus, adequate spatially-resolved detection of contact with a touch sensor device that includes the array of conductive members 910 can include resolving each one of the 16 conductive members. Continuing nesting resistors can result in resolving a greater number of conductive lines individually. Accordingly, up to five (e.g., 3, 4, or 5) nested tiers could be added, in some embodiments, while maintaining adequate spatial resolution. It is noted that the number of nested tiers may be limited by the magnitude of R1.

Figure 11:
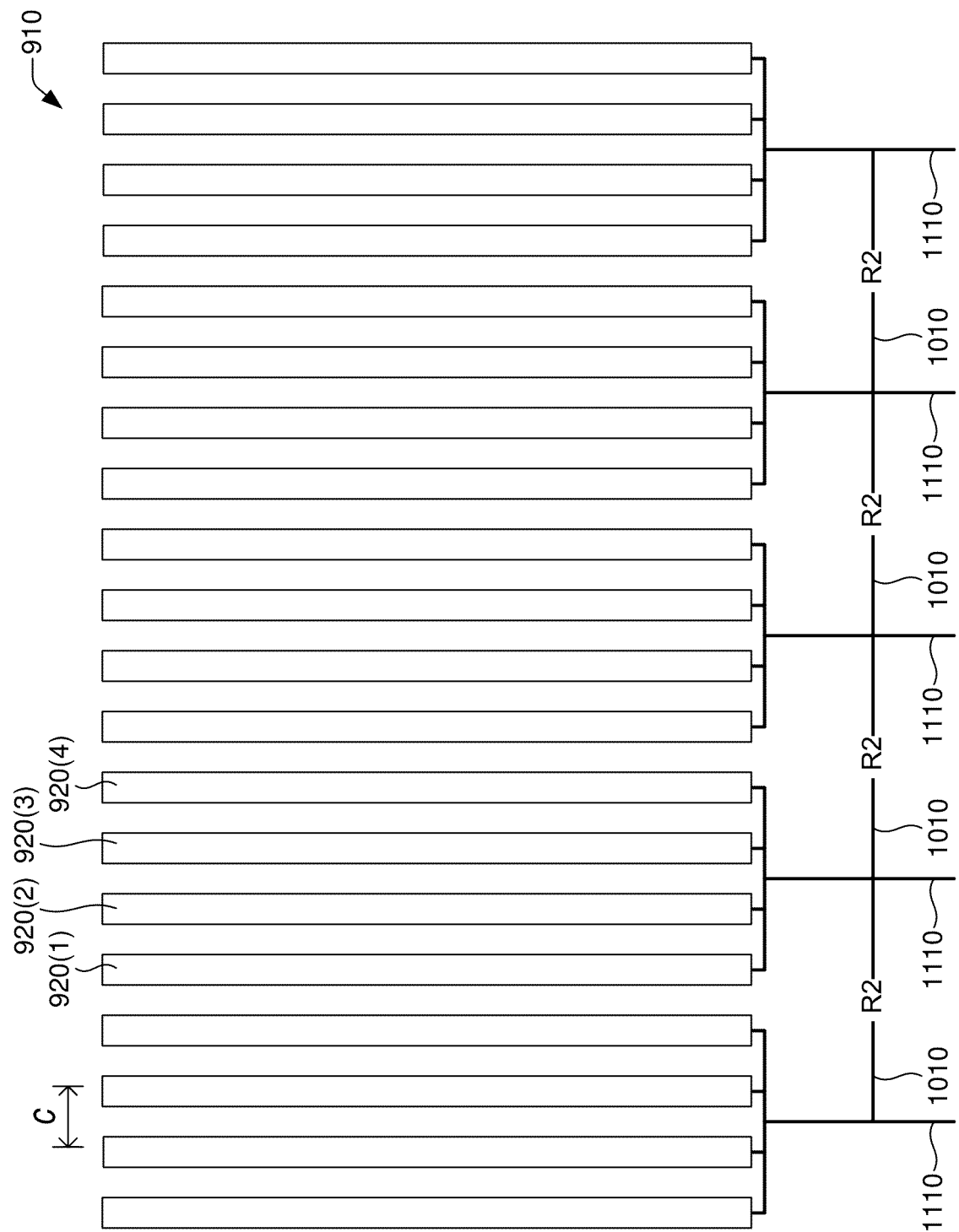
FIG. 11 illustrates yet another example of an array of conductive members coupled by internal resistors, the conductive members can embody sense lines or drive lines of a touch senor device, in accordance with one or more embodiments of this disclosure.
Figure 12:
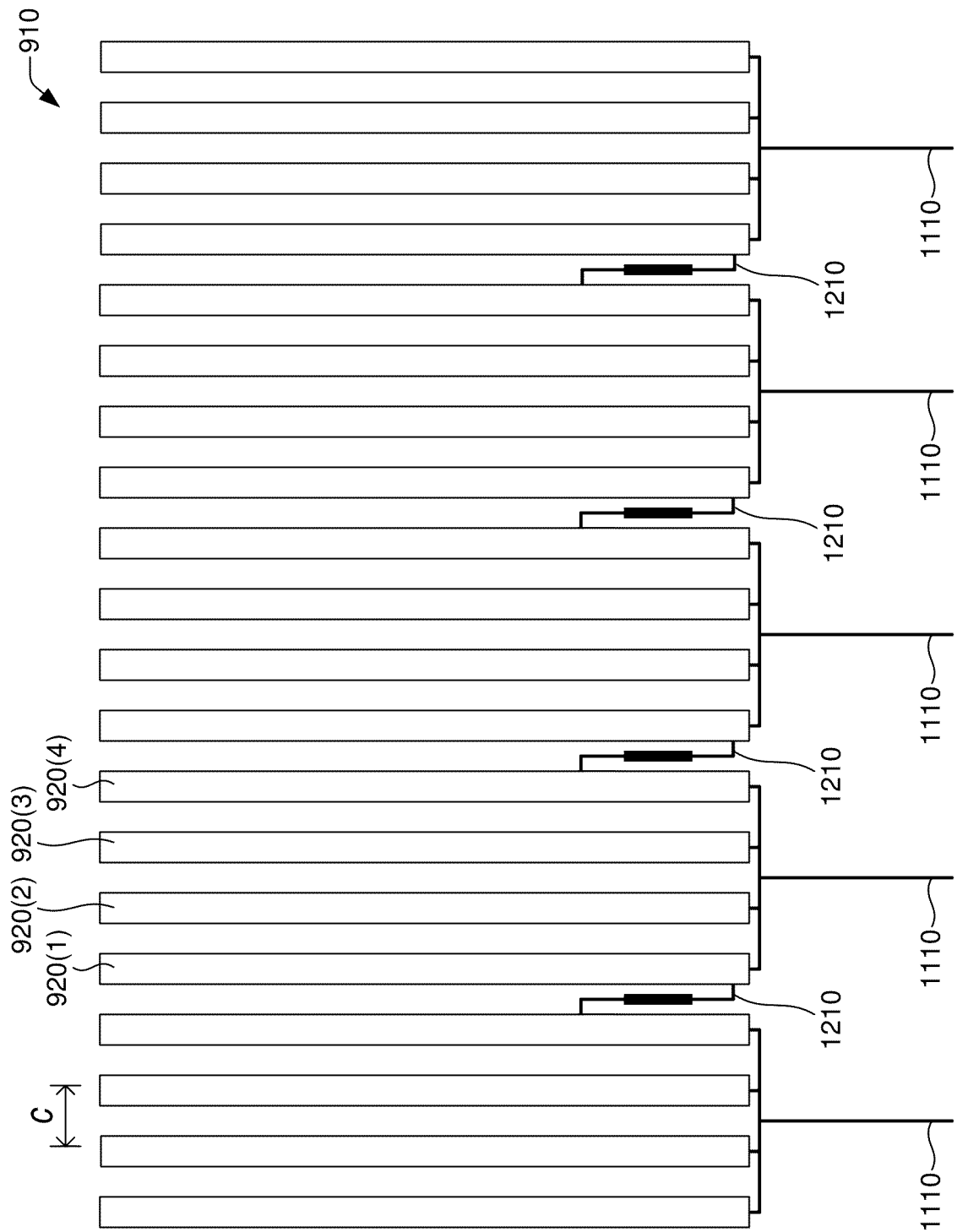
FIG. 12 illustrates yet another example of an array of conductive members coupled by internal resistors, the conductive members can embody sense lines or drive lines of a touch senor device, in accordance with one or more embodiments of this disclosure.

Other approaches to reduce the number of routing traces relative to commonplace touch sensor devices can include removal of a nested set of resistors and shorting of conductive members in a group of conductive members integrated into a touch sensor device. In some embodiments, as is illustrated in FIG. 11, conductive members within a group of conductive members can be shorted together and coupled (electrically and mechanically) to a routing trace 1120. A resistor 1010 couples a first routing trace 1120 corresponding to a first group and an adjacent second routing trace 1120 corresponding to a second group. In other embodiments, as is illustrated in FIG. 12, the conductive members in a group of conductive members also can be shorted, and internal resistors can be assembled within the sensing area instead of being assembled in the connecting pad of the touch senor device that includes the conductive member assembly 910. As a result, area in the connecting pad can be saved and form factor need increase by the addition of internal resistors. Rather than coupling adjacent routing traces, a resistor 1210 can couple (electrically, for example) a conductive member in a first group of conductive members and a second conductive member in a second group of conductive members. A resistance of a resistor 1210 can have a magnitude in a range from about 100 Ω to about 10000 Ω. In some cases, that resistance can have a magnitude in a range from about 100 Ω to about 10000 Ω.

FIGS. 13 illustrates an example of an array of conductive members 1310 that can embody sense lines or drive lines, in accordance with one or more embodiments of this disclosure. Similar to other assemblies of sense lines (e.g., sense lines 110 (FIG. 1)) or drive lines (e.g., drive lines 120 (FIG. 1), the conductive members 1310 form a periodic structure along an e direction, where the periodic structure has a defined pitch c. The defined pitch c has a magnitude in a range from about 50 μm to about 5 mm. In one example, c can be equal to 1 mm. The e direction can be one of x direction or $_y$ direction. As is shown in FIG. 13A, simply for the sake of illustration, the conductive members 910 can be logically grouped into groups containing two conductive members. As mentioned, the disclosure is not limited in that respect and groups having greater than two conductive members can be formed. A first conductive member of the conductive members in a group can be coupled (electrically and mechanically) to a first routing trace 1330 that extends to a connector (not depicted in FIG. 13A). The remaining conductive member in the group can be coupled (electrically and mechanically) to the first conductive member by a resistor. That remaining conductive member also can be coupled to a second routing trace 1330 by another resistor. The first routing trace 1330 also can be coupled to the second routing trace 1330 by that other resistor.

More specifically, a group of conductive members can include a first conductive member 1320(1) and a second conductive member 1320(2). The first conductive member 1320(1) and the second conductive member 1320(2) are coupled to one another by a resistor (generically denoted by "R1" in FIG. 13A simply for the sake of representation). The first conductive member 1320(1) also is coupled to a first routing trace 1330 by the resistor. In turn, the second conductive member 1320(2) is directly connected to the first routing trace 1330. The second conductive member 1320(2) also is coupled to a second routing trace 1330 by a resistor (also shown as "R1" in FIG. 13A). Such couplings between conductive members and conductive members and routing traces are repeated periodically, in groups of two consecutive conductive members, across the array of conductive members 1310.

Figure 13B:
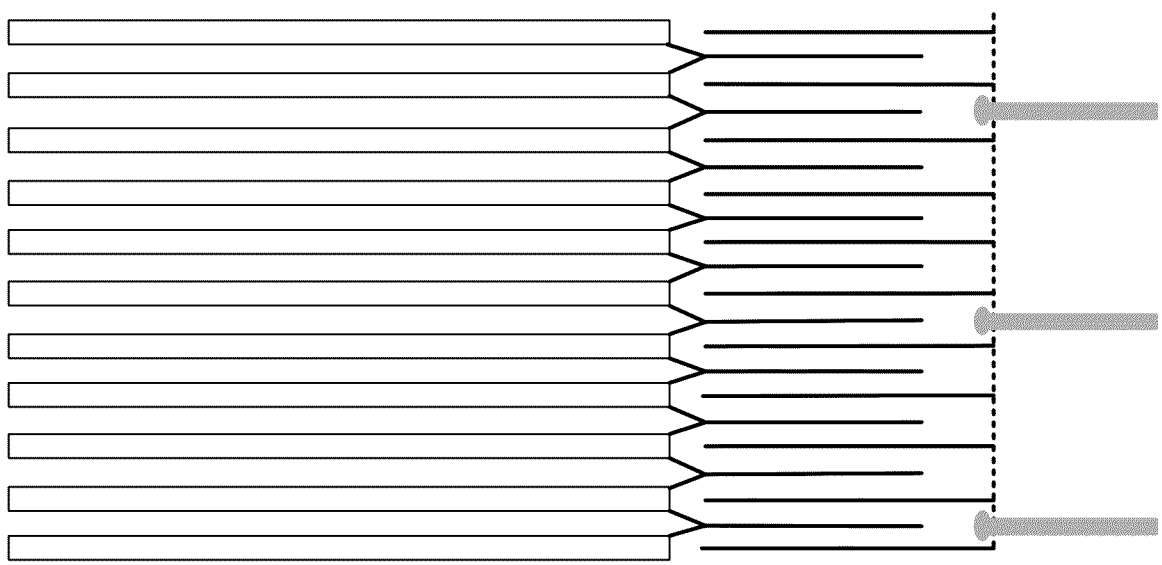
FIG. 13B illustrates an example of a section of a touch sensor device that includes nitrated resistors formed by insulating layers intercalated in a conductive layer, in accordance with one or more embodiments of this disclosure.

FIG. 13B illustrates an example of a section of a touch sensor device that includes integrated resistors formed by insulating layers intercalated in a conductive layer, in accordance with one or more embodiments of this disclosure. Such resistors can embody resistors R1 in FIG. 13A.

As is described above, integrated resistors can be nested to reduce a number of routing traces present in a connecting pad of a touch sensor device. Specifically, the number of routing traces 1330 coupled to the array of conductive members 1310 can be reduced by adding a set of one or more second resistors to the connecting pad that includes the resistors connecting conductive members in the array and routing traces 1330. At least a subset of the resistors can be nested within the set of second resistor(s). Each resistor in the set of resistor(s) couples a first routing trace to a second routing trace. The number of resistors in the set of second resistor(s) can determine the degree of reduction in the number of routing traces. Nesting can be continued by adding a set of one or more third resistors to the connecting pad that includes the multiple series of resistors and the set of second resistor(s), where the set of second resistor(s) and the multiple series of resistors 940 are nested within the set of third resistor(s). The additional nesting yields further reduction of the number of routing traces coupled to the array of conductive members 1310.

Another example of nested resistors is shown in FIG. 14. The multiple series of resistors R1 are nested inside a set of resistors 1410. The set of resistors can be connected in series, each coupling adjacent routing traces 1330 by forming an electric pathway between the adjacent routing traces 1330. As is shown in FIG. 14, the nesting results in the removal of routing traces 1330 from the configuration of routing traces shown in FIG. 13A. In some embodiments, each one of the resistors in the set of resistors 1410 can have a resistance that is a multiple of the resistance of a resistor R1. As mentioned, the multiplicity can be greater than 2, in some cases. For example, the multiplicity can range from 2 to 10 and, in some in some configurations, the multiplicity can be 100. A resistance of a resistor 1410 can have a magnitude in a range from about 100 Ω to about 10000 Ω. In some cases, that resistance can have a magnitude in a range from about 100 Ω to about 10000 Ω.

As mentioned, nesting of resistors could be continued up until available area in the connective pad that contains the resistors R1 and R2 has been exhausted and/or spatial resolution of individual conductive members is no longer achieved. Accordingly, up to five (e.g., 3, 4, or 5) nested tiers could be added, in some embodiments, while maintaining adequate spatial resolution.

Figure 15:
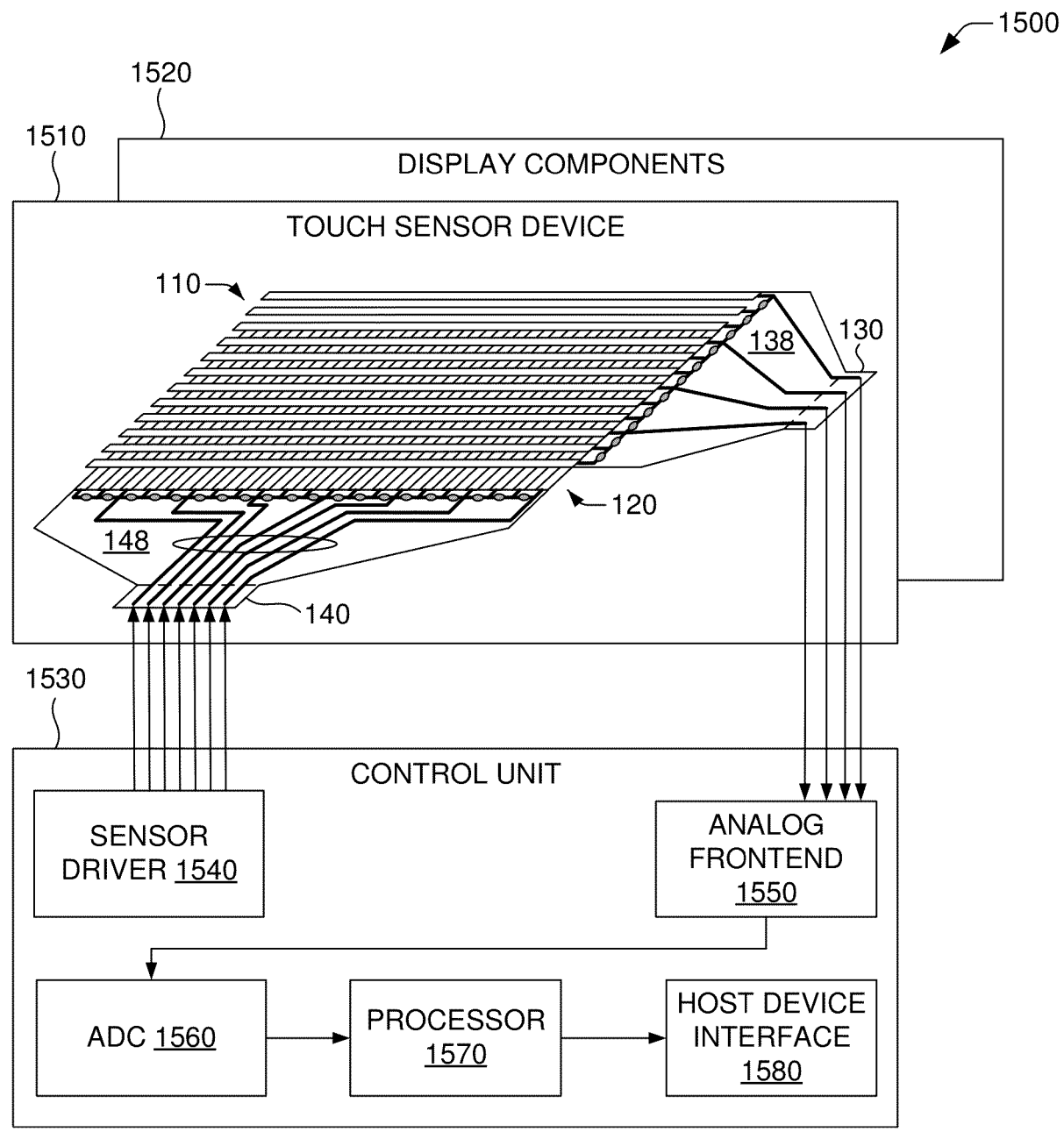
FIG. 15 illustrates an example of a display device in accordance with one or more embodiments of this disclosure.

FIG. 15 illustrates an example of a display device 1500 in accordance with one or more embodiments of this disclosure. The display device 1500 includes a touch sensor device 1510 including a first array of conductive members and a second array of conductive members. In some embodiments, the first array of conductive lines serves as an array of sense lines and the second array of conductive members serves as an array of drive lines. Simply for purposes of illustration, in FIG. 15, the first array of conductive members can be embodied in the array of sense lines 110 and the second array can be embodied in the array of drive lines 120.

The touch sensor device 1510 also can include a first routing trace electrically coupled to a first conductive member of the array of conductive member, the first routing trace extending to a connector integrated into the touch sensor device 1510. The touch sensor device 1510 also can include a second routing trace electrically coupled to a second conductive member of the array of conductive members, the second routing trace also extending to the connector. The touch sensor device 1510 can further include a first resistor that electrically couples the first routing trace and the second routing trace. In the touch sensor device 1510, a third conductive member of the array of conductive members is placed between the first conductive member and the second conductive member.

Further, the touch sensor device 1510 can include a third routing trace electrically coupled to a first conductive member of the second array of conductive members, the third routing trace extending to a second connector integrated into the touch sensor device. The touch sensor device 1510 also can include a fourth routing trace electrically coupled to a second conductive member of the second array of conductive members, the second routing trace extending to the connector. In addition, the touch sensor device 1510 can include a second resistor that electrically couples the third routing trace and the fourth routing trace. In the touch sensor device 1510, a third conductive member of the second array of conductive members is placed between the first conductive member of the second array of conductive members and the second conductive member of the second array of conductive members.

In some embodiments, the first resistor includes a first printed pad of a resistive material, the first printed pad having a resistance in a range from about 100 Ω to about 10000 Ω. In addition, the second resistor includes a second printed pad of a resistive material, the second printed pad having a resistance in a range from about 100 Ω to about 10000 Ω.

In other embodiments, the first resistor includes multiple insulating members intercalated between sections of a conductive material. The multiple insulating members form a pattern that defines multiple constrictions. The first resistor has a resistance in a range from about 100 Ω to about 10000 Ω. In addition, or in yet other embodiments, the second resistor includes multiple insulating members intercalated between sections of a conductive material. Such multiple insulating members form a pattern that defines multiple constrictions. The second resistor has a resistance in a range from about 100 Ω to about 10000 Ω.

In still other embodiments, the first resistor includes a first series of individual resistors, where the first resistor has a resistance in a range from about 100 Ω to about 10000 Ω. In addition, or in other embodiments, the second resistor includes a second series of individual resistors, where the second resistor has a resistance in a range from about 100 Ω to about 10000 Ω.

In connection with the first array of conductive members, in some cases, the first conductive member includes a transparent conductor material, the second conductive member also includes the transparent conductor material, and the third conductive member comprises the transparent conductor material. In other cases, the first conductive member comprises a non-transparent conductor material, and wherein the second conductive member comprises the non-transparent conductor material, and further wherein the third conductive member comprises the non-transparent conductor material.

Consistent with other embodiments described herein, the first array of conductive member can be assembled on a planar surface and can have a pitch along a first direction on the planar surface, where the first direction is orthogonal to a second direction on the planar surface. The pitch can have a magnitude in a range from about 50 μm to about 5 mm. In addition, the second array of conductive members can be assembled on a second planar surface and can have a second pitch along a first direction on the second planar surface, where the first direction on the second planar surface is orthogonal to a second direction on the second planar surface. The second pitch can have a magnitude in a range from about 50 μm to about 5 mm.

The display device 1500 also can include display components 1520 that can permit presenting images to an end-user of a host device (such as a computing device; e.g., a mobile device or a tethered device). The relative arrangement of the display components 1520 and the touch sensor device 1510 shown in FIG. 15 is schematic. Various arrangements of the display components 1520 relative to the elements of the touch sensor device 1510 are possible. Although not depicted in FIG. 15, and consistent with embodiments described herein, the touch sensor device 1510 can include a touch sensor layer that can be exposed to the end-user. The host device can cause changes to the images presented in the display components 1520 in response to detecting particular sense points on the touch layer.

To detect one or more sense points using the touch sensor device 1510, the display device 1500 can include a control unit 1530 that can process electric signals received from the touch sensor device 1510. To that end, the control unit 1540 can include a sensor driver 1540 that can apply an electric signal (voltage, for example) to a routing trace that is coupled, via one or more resistors, with one or several conductive members in the second array of conductive members (e.g., drive lines 120). The sensor driver 1540 can apply electric signals to several (each one, in some cases) of the routing traces and associated drive lines. The sensor driver 1540 can be coupled to routing traces via electrical connections between the sensor driver 1540 and a first connector of the touch sensor device 1510. For instance, as is illustrated in FIG. 15, the first connector can be the connector 140.

Further to that end, the control unit 1530 can include an analog frontend 1550 that can receive analog electric signals from routing traces coupled to conductive members in the first array of conductive members (e.g., sense lines 110). The analog frontend 1550 can receive an electric signal (voltage, for example) from a routing trace that is coupled, via one or more resistors, with one or several conductive members in the first array of conductive members (e.g., sense lines 110). The analog frontend 1550 can be coupled to routing traces via electrical connections between the analog frontend 1550 and a second connector of the touch sensor device 1510. For instance, as is illustrated in FIG. 15, the second connector can be the connector 130.

The analog frontend 1550 can supply the electric signals to an analog-to-digital converter 1560 (ADC 1560) that can transform the received analog electric signals to digital signals. The ADC 1560 can supply the digital signals to a processor 1570 that can detect sensor points by operating on the digital signals. Simply as an illustration, the processor 1570 can be embodied a field-programmable gate array (FPGA), an application specific integrated circuit (ASIC), a digital signal processor (DSP), or a microprocessor. The processor 1570 can supply data and/or signaling to a host device interface 1580 that couples the control unit 1530 with the host device. Such data represents the sense points.

In the present specification, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in this specification and annexed drawings should generally be construed to mean "one or more" unless specified otherwise or clear from context to be directed to a singular form.

In addition, the terms "example" and "such as" are utilized herein to mean serving as an instance or illustration. Any embodiment or design described herein as an "example" or referred to in connection with a "such as" clause is not necessarily to be construed as preferred or advantageous over other embodiments or designs. Rather, use of the terms "example" or "such as" is intended to present concepts in a concrete fashion. The terms "first," "second," "third," and so forth, as used in the claims and description, unless otherwise clear by context, is for clarity only and does not necessarily indicate or imply any order in time or any particular spatial arrangement.

As is used herein, the term "about" indicates that each of the described dimensions is not a strict boundary or parameter and does not exclude functionally similar variations therefrom. Unless context or the description indicates otherwise, the use of the term "about" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

Some relationships between dimensions of a touch sensor device and between elements of the touch sensor device may be described herein using the terminology "substantially equal." As is used herein, the terminology "substantially equal" indicates that the equal relationship is not a strict relationship and does not exclude functionally similar variations therefrom. Unless context or the description indicates otherwise, the use of the terminology "substantially equal" in connection with two or more described dimensions indicates that the equal relationship between the dimensions includes variations that, using mathematical and industrial principles accepted in the art (e.g., rounding, measurement or other systematic errors, manufacturing tolerances, etc.), would not vary the least significant digit of the dimensions.

As is used herein, the term "substantially parallel" indicates that the parallel spatial relationship between two or more structural elements (e.g., member, traces, or the like) is not a strict relationship and does not exclude functionally similar variations therefrom. As used herein the term "substantially perpendicular" indicates that the perpendicular spatial relationship between two or more two or more structural elements (e.g., member, traces, or the like) are not a strict relationship and does not exclude functionally similar variations therefrom.

The term "horizontal" as is used herein may be defined as a direction parallel to a plane or surface (e.g., surface of a substrate), regardless of its orientation. The term "vertical,"

as is used herein, may refer to a direction orthogonal to the horizontal direction as just described. Terms, such as "on," "above," "below," "bottom," "top," "side" (as in "sidewall," for example), "higher," "lower," "upper," "over," and "under," may be referenced with respect to the horizontal plane.

To the extent that the term "includes" is used in either the detailed description or the claims, such term is intended to be inclusive in a manner similar to the term "comprising" as "comprising" is interpreted when employed as a transitional word in a claim. Further, conditional language, such as, among others, "can," "could," "might,," or "may," unless specifically stated otherwise, or otherwise understood within the context as used, is generally intended to convey that certain example embodiments could include, while other example embodiments do not include, certain features, elements, and/or acts. Thus, such conditional language is not generally intended to imply that features, elements, and/or acts are in any way required for one or more embodiments.

Although some embodiments of the disclosure have been described in connection with what is presently considered to be the most practical, it is to be understood that this disclosure is not to be limited to the disclosed embodiments, but on the contrary, the disclosure is intended to cover various modifications and equivalent arrangements included within the scope of the claims. Although specific terms are employed herein, they are used in a generic and descriptive sense only, and not for purposes of limitation.

This written description uses examples to disclose certain example embodiments, and also to enable any person skilled in the art to practice embodiments of the disclosure, including making and using any devices or systems and performing any disclosed methods. The patentable scope of some embodiments of the disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What has been described above includes examples of one or more embodiments of the disclosure. Although example embodiments have been described in language specific to structural features and/or methodological acts, it is to be understood that the disclosure is not necessarily limited to the specific features or acts described. Rather, the specific features and acts are disclosed as illustrative forms of implementing the example embodiments. It is, of course, not possible to describe every conceivable combination of components or methodologies for purposes of describing these examples, and it can be recognized that many further combinations and permutations of the present embodiments are possible. Accordingly, the embodiments disclosed and/or claimed herein are intended to embrace all such alterations, modifications and variations that fall within the spirit and scope of the detailed description and the appended claims.

What is claimed is:

1. A touch sensor device, comprising:
    an array of conductive members;
    a first routing trace electrically coupled to a first conductive member of the array of conductive members, the first routing trace extending to a connector integrated into the touch sensor device, wherein the first conductive member is formed as a periodic structure comprising a directionally aligned and elongated sputtered metal segment of a group of directionally aligned and elongated sputtered metal segments;
    a second routing trace electrically coupled to a second conductive member of the array of conductive members, the second routing trace extending to the connector; and
    a resistor that electrically couples the first routing trace and the second routing trace, wherein the resistor comprises multiple insulating members intercalated between sections of a conductive material, the multiple insulating members forming a pattern that defines multiple constrictions over which the conductive material that couples the first routing trace to the second routing trace is overlaid; and
    wherein a third conductive member of the array of conductive member is placed between the first conductive member and the second conductive member.

2. The touch sensor device of claim 1, the first routing trace comprises a metallic pad, and wherein the second routing trace comprises a second metallic pad.

3. The touch sensor device of claim 1, wherein the resistor comprises a deposited pad of a resistive material deposited in the same plane as the first routing trace, wherein the resistive material comprises carbon, and wherein the deposited pad has a resistance in a range from about 100 W to about 10000 W.

4. The touch sensor device of claim 1, wherein the resistor has a resistance in a range from about 100 W to about 10000 W.

5. The touch sensor device of claim 1, wherein the resistor comprises multiple individual resistors in series, wherein the resistor has a resistance in a range from about 100 W to about 10000 W.

6. The touch sensor device of claim 1, wherein the array of conductive members is assembled on a defined area of a substrate, and wherein the resistor is assembled at a periphery of the defined area.

7. The touch sensor device of claim 6, wherein the substrate comprises one of a flexible layer or a rigid layer, and wherein the substrate has a uniform thickness of a magnitude within a range from about 10 mm to about 5 mm.

8. The touch sensor device of claim 1, wherein the first conductive member comprises a transparent conductive oxide, and wherein the second conductive member comprises the transparent conductive oxide, and further wherein the third conductive member comprises the transparent conductive oxide.

9. The touch sensor device of claim 1, wherein the first conductive member comprises one or more carbon nanotubes, and wherein the second conductive member comprises at least one or more second carbon nanotubes, and further wherein the third conductive member comprises one or more third carbon nanotubes.

10. The touch sensor device of claim 1, wherein the first conductive member comprises a conductive polymer, and wherein the second conductive member comprises the conductive polymer, and further wherein the third conductive member comprises the conductive polymer.

11. The touch sensor device of claim 10, wherein the conductive polymer is translucent and comprises poly(3,4-ethylenedioxythiophene) polystyrene sulfonate (PEDOT:PSS).

12. The touch sensor device of claim 1, wherein the first conductive member comprises a metal nanowire, and wherein the second conductive member comprises a second metal nanowire, and further wherein the third conductive member comprises a third metal nanowire.

13. The touch sensor device of claim 12, wherein each one of the metal nanowire, the second metal nanowire, and the third metal nanowire comprises a noble metal, a transition metal, or a simple metal.

14. The touch sensor device of claim 13 wherein the array of conductive members constitutes a metal mesh.

15. The touch sensor device of claim 1, wherein the array of conductive members is assembled on a planar surface and has a defined pitch along a first direction on the planar surface, the first direction being orthogonal to a second direction on the planar surface, wherein the pitch has a magnitude in a range from about 50 mm to about 5 mm.

16. The touch sensor device of claim 1, wherein the array of conductive members is assembled on a curved surface, wherein a distance separating adjacent conductive members in the array along a geodesic on the curved surface has a magnitude in a range from about 50 mm to about 5 mm, the geodesic being orthogonal to a second geodesic on the curved plane.

17. A display device, comprising:
a touch sensor device comprising,
an array of conductive members;
a first routing trace electrically coupled to a first conductive member of the array of conductive member, the first routing trace extending to a connector integrated into the touch sensor device, wherein the first conductive member is formed as a periodic structure comprising a sputtered metal segment of a group of sputtered metal segments;
a second routing trace electrically coupled to a second conductive member of the array of conductive members, the second routing trace extending to the connector; and
a first resistor that electrically couples the first routing trace and the second routing trace, wherein the first resistor comprises multiple insulating members intercalated between sections of a conductive material, the multiple insulating members forming a pattern that defines multiple constrictions over which the conductive material that couples the first routing trace to the second routing trace is overlaid;
wherein a third conductive member of the array of conductive members is placed between the first conductive member and the second conductive member.

18. The display device of claim 17, wherein the touch sensor device further comprises,
a second array of conductive members;
a third routing trace electrically coupled to a first conductive member of the second array of conductive members, the third routing trace extending to a second connector integrated into the touch sensor device;
a fourth routing trace electrically coupled to a second conductive member of the second array of conductive members, the second routing trace extending to the connector; and
a second resistor that electrically couples the third routing trace and the fourth routing trace;
wherein a third conductive member of the second array of conductive members is placed between the first conductive member of the second array of conductive members and the second conductive member of the second array of conductive members.

19. The display device of claim 18, wherein the first resistor comprises a first printed pad of a resistive material, the first printed pad having a resistance in a range from about 100 W to about 10000 W, and wherein the second resistor comprises a second printed pad of a resistive material, the second printed pad having a resistance in a range from about 100 W to about 10000 W.

20. The display device of claim 17, wherein the first resistor has a resistance in a range from about 100 W to about 10000 W.

21. The display device of claim 18, wherein the second resistor comprises multiple insulating members intercalated between sections of a conductive material, the multiple insulating members forming a pattern that defines multiple constrictions, and wherein the second resistor has a resistance in a range from about 100 W to about 10000 W.

22. The display device of claim 18, wherein the first resistor comprises a first series of individual resistors, wherein the first resistor has a resistance in a range from about 250 W to about 10000 W, and wherein the second resistor comprises a second series of individual resistors, wherein the second resistor has a resistance in a range from about 100 W to about 10000 W.

23. The display device of claim 17, wherein the first conductive member comprises a transparent conductor material, and wherein the second conductive member comprises the transparent conductor material, and further wherein the third conductive member comprises the transparent conductor material.

24. The display device of claim 17, wherein the first conductive member comprises a non-transparent conductor material, and wherein the second conductive member comprises the non-transparent conductor material, and further wherein the third conductive member comprises the non-transparent conductor material.

25. The display device of claim 18, wherein the first array of conductive member is assembled on a planar surface and has a pitch along a first direction on the planar surface, the first direction being orthogonal to a second direction on the planar surface, wherein the pitch has a magnitude in a range from about 50 mm to about 5 mm.

26. The display device of claim 25, wherein the second array of conductive members is assembled on a second planar surface and has a second pitch along a first direction on the second planar surface, the first direction on the second planar surface being orthogonal to a second direction on the second planar surface, wherein the second pitch has a magnitude in a range from about 50 mm to about 5 mm.

* * * * *